US009016627B2

(12) United States Patent
Margis et al.

(10) Patent No.: US 9,016,627 B2
(45) Date of Patent: Apr. 28, 2015

(54) SYSTEM AND METHOD FOR PROVIDING AN INTEGRATED USER INTERFACE SYSTEM AT A SEAT

(75) Inventors: Paul Anthony Margis, Irvine, CA (US); Mehdi Izadyar, Trabuco Canyon, CA (US); Marshal H. Perlman, Portola Hills, CA (US); Kaname Tomita, Osaka (JP); Yasuhiro Araki, Osaka (JP); Taku Yamada, Irvine, CA (US); Omar Lopez, Corona, CA (US); Craig Allan Depner, Trabuco Canyon, CA (US); Sheng Tong, Costa Mesa, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 814 days.

(21) Appl. No.: 12/896,347

(22) Filed: Oct. 1, 2010

(65) Prior Publication Data

US 2011/0174926 A1    Jul. 21, 2011

Related U.S. Application Data

(60) Provisional application No. 61/278,166, filed on Oct. 2, 2009, provisional application No. 61/340,627, filed on Mar. 19, 2010.

(51) Int. Cl.
*B64D 11/06* (2006.01)
*B64D 25/02* (2006.01)
(Continued)

(52) U.S. Cl.
CPC ............... *G06F 1/18* (2013.01); *B60N 2/4876* (2013.01); *B60N 3/004* (2013.01); *B64D 11/0015* (2013.01); *H04N 7/18* (2013.01); *Y02T 50/46* (2013.01); *B64D 11/0624* (2013.01)

(58) Field of Classification Search
USPC ....... 244/118.5, 118.6, 122 R; D14/126, 129, D14/157
See application file for complete search history.

(56) References Cited

U.S. PATENT DOCUMENTS

| 3,037,812 A | 6/1962 | Monroe |
| 3,980,954 A | 9/1976 | Whyte |

(Continued)

FOREIGN PATENT DOCUMENTS

| CN | 1104160 A | 6/1995 |
| CN | 1462552 A | 12/2003 |

(Continued)

OTHER PUBLICATIONS

Chen, Y.F., et al., "Personalized Multimedia Services Using a Mobile Service Platform", IEEE 2002, pp. 918-925.

(Continued)

*Primary Examiner* — Tien Dinh
*Assistant Examiner* — Steven Hawk
(74) *Attorney, Agent, or Firm* — Orrick Herrington & Sutcliffe LLP

(57) ABSTRACT

A light-weight and low-power integrated system module suitable for installation at a passenger seat disposed aboard a passenger vehicle and methods for manufacturing and using same. By integrating selected interface system components with the associated interconnections, the integrated system module provides an intuitive user interface system for interacting with a passenger entertainment system. The integrated system module can be installed within a seatback of the passenger seat that compliments the look and feel of the user interface system, creating an immersive entertainment experience during travel.

32 Claims, 17 Drawing Sheets

(51) Int. Cl.
*G06F 1/18* (2006.01)
*B60N 2/48* (2006.01)
*B60N 3/00* (2006.01)
*B64D 11/00* (2006.01)
*H04N 7/18* (2006.01)

(56) References Cited

U.S. PATENT DOCUMENTS

| | | |
|---|---|---|
| 4,367,488 A | 1/1983 | Leventer et al. |
| 4,584,603 A | 4/1986 | Harrison |
| 4,647,980 A | 3/1987 | Steventon et al. |
| 4,742,544 A | 5/1988 | Kupnicki et al. |
| 4,774,514 A | 9/1988 | Hildebrandt et al. |
| 4,866,515 A | 9/1989 | Tagawa et al. |
| 4,866,704 A | 9/1989 | Bergman |
| 4,866,732 A | 9/1989 | Carey et al. |
| 4,887,152 A | 12/1989 | Matsuzaki et al. |
| 4,890,104 A | 12/1989 | Takanabe et al. |
| 4,896,209 A | 1/1990 | Matsuzaki et al. |
| 4,897,714 A | 1/1990 | Ichise et al. |
| 4,958,381 A | 9/1990 | Toyoshima |
| 4,975,696 A | 12/1990 | Salter, Jr. et al. |
| 5,005,183 A | 4/1991 | Carey et al. |
| 5,034,808 A | 7/1991 | Murray |
| 5,123,015 A | 6/1992 | Brady, Jr. et al. |
| 5,144,290 A | 9/1992 | Honda et al. |
| 5,151,896 A | 9/1992 | Bowman et al. |
| 5,177,616 A | 1/1993 | Riday |
| 5,189,671 A | 2/1993 | Cheng |
| 5,208,590 A | 5/1993 | Pitts |
| 5,237,659 A | 8/1993 | Takats |
| 5,289,272 A | 2/1994 | Rabowsky et al. |
| 5,295,089 A | 3/1994 | Ambasz |
| 5,311,302 A * | 5/1994 | Berry et al. ............... 348/14.03 |
| 5,311,515 A | 5/1994 | Henderson et al. |
| 5,325,131 A | 6/1994 | Penney |
| 5,383,178 A | 1/1995 | Unverrich |
| 5,390,326 A | 2/1995 | Shah et al. |
| 5,410,754 A | 4/1995 | Klotzbach et al. |
| 5,444,762 A | 8/1995 | Frey et al. |
| 5,463,656 A | 10/1995 | Polivka et al. |
| 5,469,363 A | 11/1995 | Saliga |
| 5,481,478 A | 1/1996 | Palmieri et al. |
| 5,493,702 A | 2/1996 | Crowley et al. |
| 5,524,272 A | 6/1996 | Podowski et al. |
| 5,529,265 A * | 6/1996 | Sakurai ..................... 244/118.5 |
| 5,555,466 A | 9/1996 | Scribner et al. |
| 5,557,342 A | 9/1996 | Eto et al. |
| 5,557,656 A | 9/1996 | Ray et al. |
| 5,568,484 A | 10/1996 | Margis |
| 5,596,647 A | 1/1997 | Wakai et al. |
| 5,610,822 A | 3/1997 | Murphy |
| 5,617,331 A | 4/1997 | Wakai et al. |
| 5,640,002 A | 6/1997 | Ruppert et al. |
| 5,666,291 A | 9/1997 | Scott et al. |
| 5,701,582 A | 12/1997 | DeBey |
| 5,706,353 A | 1/1998 | Arai et al. |
| 5,709,448 A | 1/1998 | Jennings et al. |
| 5,711,014 A | 1/1998 | Crowley et al. |
| 5,745,159 A | 4/1998 | Wax et al. |
| 5,760,819 A | 6/1998 | Sklar et al. |
| 5,790,423 A | 8/1998 | Lau et al. |
| 5,790,787 A | 8/1998 | Scott et al. |
| 5,801,751 A | 9/1998 | Sklar et al. |
| 5,808,660 A | 9/1998 | Sekine et al. |
| 5,831,664 A | 11/1998 | Wharton |
| 5,832,380 A | 11/1998 | Ray et al. |
| 5,835,127 A | 11/1998 | Booth et al. |
| 5,857,869 A | 1/1999 | Parcel et al. |
| 5,878,345 A | 3/1999 | Ray et al. |
| 5,889,268 A | 3/1999 | Swartz |
| 5,889,775 A | 3/1999 | Sawicz et al. |
| 5,929,895 A | 7/1999 | Berry et al. |
| 5,950,129 A | 9/1999 | Schmid et al. |
| 5,953,429 A | 9/1999 | Wakai et al. |
| 5,957,407 A * | 9/1999 | Auestad ..................... 244/118.6 |
| 5,959,596 A | 9/1999 | McCarten et al. |
| 5,960,343 A | 9/1999 | Ray et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,012,679 A * | 1/2000 | Auestad ..................... 244/118.6 |
| 6,014,381 A | 1/2000 | Troxel et al. |
| 6,047,165 A | 4/2000 | Wright et al. |
| 6,058,288 A | 5/2000 | Reed et al. |
| 6,078,348 A | 6/2000 | Klosterman et al. |
| 6,108,523 A | 8/2000 | Wright et al. |
| 6,108,539 A | 8/2000 | Ray et al. |
| 6,129,274 A | 10/2000 | Suzuki |
| 6,130,727 A | 10/2000 | Toyozumi |
| 6,135,549 A | 10/2000 | Demick et al. |
| 6,151,497 A | 11/2000 | Yee et al. |
| 6,154,186 A | 11/2000 | Smith et al. |
| 6,160,998 A | 12/2000 | Wright et al. |
| 6,163,681 A | 12/2000 | Wright et al. |
| 6,167,238 A | 12/2000 | Wright |
| 6,173,159 B1 | 1/2001 | Wright et al. |
| 6,177,887 B1 | 1/2001 | Jerome |
| 6,181,990 B1 | 1/2001 | Grabowsky et al. |
| 6,201,797 B1 | 3/2001 | Leuca et al. |
| 6,208,307 B1 | 3/2001 | Frisco et al. |
| 6,216,065 B1 | 4/2001 | Hall et al. |
| 6,249,913 B1 | 6/2001 | Galipeau et al. |
| 6,278,936 B1 | 8/2001 | Jones |
| 6,285,878 B1 | 9/2001 | Lai |
| 6,308,045 B1 | 10/2001 | Wright et al. |
| 6,321,084 B1 | 11/2001 | Horrer |
| 6,338,045 B1 | 1/2002 | Pappas |
| 6,345,720 B1 | 2/2002 | Redden et al. |
| 6,370,656 B1 | 4/2002 | Olarig et al. |
| 6,377,802 B1 | 4/2002 | McKenna et al. |
| 6,390,920 B1 | 5/2002 | Infiesto et al. |
| 6,392,692 B1 | 5/2002 | Monroe |
| 6,408,180 B1 | 6/2002 | McKenna et al. |
| 6,484,011 B1 | 11/2002 | Thompson et al. |
| 6,487,540 B1 | 11/2002 | Smith et al. |
| 6,499,027 B1 | 12/2002 | Weinberger |
| 6,507,279 B2 | 1/2003 | Loof |
| 6,507,952 B1 | 1/2003 | Miller et al. |
| 6,519,693 B1 | 2/2003 | Debey |
| 6,522,867 B1 | 2/2003 | Wright et al. |
| 6,529,706 B1 | 3/2003 | Mitchell |
| 6,538,656 B1 | 3/2003 | Cheung et al. |
| 6,542,086 B2 | 4/2003 | Baumgartner et al. |
| 6,549,754 B1 | 4/2003 | Miller et al. |
| 6,559,812 B1 | 5/2003 | McCarten et al. |
| 6,570,881 B1 | 5/2003 | Wils et al. |
| 6,574,338 B1 | 6/2003 | Sachdev |
| 6,594,471 B1 | 7/2003 | Crowley et al. |
| 6,598,227 B1 | 7/2003 | Berry et al. |
| 6,600,418 B2 | 7/2003 | Francis et al. |
| 6,609,103 B1 | 8/2003 | Kolls |
| 6,611,537 B1 | 8/2003 | Edens et al. |
| 6,618,580 B2 | 9/2003 | Parrott et al. |
| 6,622,124 B1 | 9/2003 | Kolls |
| 6,637,484 B1 | 10/2003 | Kraft |
| 6,643,510 B2 | 11/2003 | Taylor |
| 6,650,898 B2 | 11/2003 | Jochim et al. |
| 6,658,595 B1 | 12/2003 | Thamattoor |
| 6,661,353 B1 | 12/2003 | Gopen |
| 6,693,236 B1 | 2/2004 | Gould et al. |
| 6,702,604 B1 | 3/2004 | Moscovitch |
| 6,725,035 B2 | 4/2004 | Jochim et al. |
| 6,736,315 B2 | 5/2004 | Swartz |
| 6,741,841 B1 | 5/2004 | Mitchell |
| 6,745,010 B2 | 6/2004 | Wright et al. |
| 6,748,597 B1 | 6/2004 | Frisco et al. |
| 6,757,712 B1 | 6/2004 | Bastian et al. |
| 6,775,545 B2 | 8/2004 | Wright et al. |
| 6,782,392 B1 | 8/2004 | Weinberger et al. |
| 6,788,935 B1 | 9/2004 | McKenna et al. |
| 6,796,495 B2 | 9/2004 | Stahl et al. |
| 6,807,148 B1 | 10/2004 | Eicher |

(56) References Cited

U.S. PATENT DOCUMENTS

| | | | |
|---|---|---|---|
| 6,807,538 | B1 | 10/2004 | Weinberger et al. |
| 6,810,527 | B1 | 10/2004 | Conrad et al. |
| 6,866,225 | B2 * | 3/2005 | Jones et al. ............... 244/118.5 |
| 6,876,905 | B2 | 4/2005 | Farley et al. |
| 6,885,845 | B1 | 4/2005 | Crowley et al. |
| 6,885,863 | B2 | 4/2005 | Parkman et al. |
| 6,885,864 | B2 | 4/2005 | McKenna et al. |
| 6,889,042 | B2 | 5/2005 | Rousseau et al. |
| 6,892,052 | B2 | 5/2005 | Kotola et al. |
| 6,899,390 | B2 | 5/2005 | Sanfrod et al. |
| 6,937,164 | B2 | 8/2005 | Thomson et al. |
| 6,938,258 | B1 | 8/2005 | Weinberger et al. |
| 6,947,726 | B2 | 9/2005 | Rockwell |
| 6,971,608 | B2 | 12/2005 | Harrington et al. |
| 6,973,479 | B2 | 12/2005 | Brady, Jr. et al. |
| 6,983,312 | B1 | 1/2006 | O'Neil |
| 6,985,588 | B1 | 1/2006 | Glick et al. |
| 6,985,942 | B2 | 1/2006 | D'Annunzio et al. |
| 6,990,338 | B2 | 1/2006 | Miller et al. |
| 7,003,293 | B2 | 2/2006 | D'Annunzio |
| 7,036,889 | B2 | 5/2006 | Sanfrod et al. |
| 7,062,268 | B2 | 6/2006 | McKenna |
| 7,070,150 | B2 * | 7/2006 | Jones et al. ............... 244/118.5 |
| 7,100,187 | B2 | 8/2006 | Pierzga et al. |
| 7,107,062 | B2 | 9/2006 | Cruz et al. |
| 7,113,780 | B2 | 9/2006 | McKenna et al. |
| 7,124,426 | B1 | 10/2006 | Tsuria et al. |
| 7,136,621 | B2 | 11/2006 | de La Chapelle et al. |
| 7,161,788 | B2 | 1/2007 | Richie et al. |
| 7,162,235 | B1 | 1/2007 | Gilbert |
| 7,171,197 | B2 | 1/2007 | Miller et al. |
| 7,177,638 | B2 | 2/2007 | Funderburk et al. |
| 7,187,927 | B1 | 3/2007 | Mitchell |
| 7,233,958 | B2 | 6/2007 | Weng |
| D551,197 | S * | 9/2007 | Vitito ............... D14/129 |
| 7,280,825 | B2 | 10/2007 | Keen et al. |
| 7,286,503 | B1 | 10/2007 | Clarke et al. |
| D556,711 | S * | 12/2007 | Lee et al. ............... D14/132 |
| 7,328,012 | B2 | 2/2008 | Ziarno et al. |
| D564,991 | S * | 3/2008 | Vitito ............... D14/126 |
| 7,343,157 | B1 | 3/2008 | Mitchell |
| 7,354,019 | B2 * | 4/2008 | Bauer ............... 244/118.6 |
| 7,359,700 | B2 | 4/2008 | Swensen et al. |
| 7,400,858 | B2 | 7/2008 | Crowley et al. |
| 7,406,309 | B2 | 7/2008 | Usher et al. |
| 7,454,203 | B2 | 11/2008 | Levitan |
| 7,460,866 | B2 | 12/2008 | Salkini et al. |
| 7,483,696 | B1 | 1/2009 | Mitchell |
| 7,486,927 | B2 | 2/2009 | Kallio et al. |
| 7,496,361 | B1 | 2/2009 | Mitchell et al. |
| D590,787 | S * | 4/2009 | Vitito ............... D14/126 |
| D594,431 | S * | 6/2009 | Vitito ............... D14/129 |
| D597,980 | S * | 8/2009 | Vitito ............... D14/129 |
| D635,108 | S * | 3/2011 | Hughes et al. ............... D14/129 |
| D637,984 | S * | 5/2011 | Willard ............... D14/129 |
| D640,215 | S * | 6/2011 | Hanson-Abbott ............... D14/126 |
| D640,654 | S * | 6/2011 | Montag et al. ............... D14/129 |
| D669,873 | S * | 10/2012 | Margis et al. ............... D14/129 |
| D669,874 | S * | 10/2012 | Margis et al. ............... D14/129 |
| 8,376,457 | B2 * | 2/2013 | Muirhead ............... 297/217.3 |
| D677,639 | S * | 3/2013 | Margis et al. ............... D14/129 |
| 2001/0025377 | A1 | 9/2001 | Hinderks |
| 2002/0013150 | A1 | 1/2002 | McKenna et al. |
| 2002/0045444 | A1 | 4/2002 | User et al. |
| 2002/0045484 | A1 * | 4/2002 | Eck et al. ............... 463/42 |
| 2002/0046406 | A1 | 4/2002 | Chelehmal et al. |
| 2002/0058478 | A1 | 5/2002 | de La Chapelle et al. |
| 2002/0059363 | A1 | 5/2002 | Katz et al. |
| 2002/0059614 | A1 | 5/2002 | Lipsanen et al. |
| 2002/0065711 | A1 | 5/2002 | Fujisawa et al. |
| 2002/0069293 | A1 | 6/2002 | Natalio |
| 2002/0087992 | A1 | 7/2002 | Bengeult et al. |
| 2002/0094829 | A1 | 7/2002 | Ritter |
| 2002/0095574 | A1 | 7/2002 | Kori |
| 2002/0095680 | A1 | 7/2002 | Davidson |
| 2002/0136540 | A1 * | 9/2002 | Adams et al. ............... 386/125 |
| 2002/0152470 | A1 | 10/2002 | Hammond |
| 2002/0162113 | A1 | 10/2002 | Hunter |
| 2002/0164960 | A1 | 11/2002 | Slaughter et al. |
| 2002/0170060 | A1 | 11/2002 | Lyman |
| 2002/0178451 | A1 | 11/2002 | Ficco |
| 2002/0184555 | A1 | 12/2002 | Wong et al. |
| 2002/0197990 | A1 | 12/2002 | Jochim et al. |
| 2003/0003899 | A1 | 1/2003 | Tashiro et al. |
| 2003/0008652 | A1 | 1/2003 | Jochim et al. |
| 2003/0020991 | A1 | 1/2003 | Chang |
| 2003/0043760 | A1 | 3/2003 | Taylor |
| 2003/0047647 | A1 | 3/2003 | Poblete |
| 2003/0055975 | A1 | 3/2003 | Nelson et al. |
| 2003/0060190 | A1 | 3/2003 | Mallart |
| 2003/0067542 | A1 | 4/2003 | Monroe |
| 2003/0069015 | A1 | 4/2003 | Brinkley et al. |
| 2003/0069990 | A1 | 4/2003 | D'Annunzio et al. |
| 2003/0084130 | A1 | 5/2003 | D'Annunzio |
| 2003/0084451 | A1 | 5/2003 | Pierzga et al. |
| 2003/0085818 | A1 | 5/2003 | Renton et al. |
| 2003/0087672 | A1 | 5/2003 | Kattukaran et al. |
| 2003/0093798 | A1 | 5/2003 | Rogerson |
| 2003/0107248 | A1 * | 6/2003 | Sanford et al. ............... 297/217.3 |
| 2003/0126614 | A1 | 7/2003 | Staiger |
| 2003/0130769 | A1 | 7/2003 | Farley et al. |
| 2003/0148736 | A1 | 8/2003 | Wright et al. |
| 2003/0158958 | A1 | 8/2003 | Chiu |
| 2003/0160710 | A1 | 8/2003 | Baumgartner et al. |
| 2003/0161411 | A1 | 8/2003 | McCorkle et al. |
| 2003/0169563 | A1 | 9/2003 | Adams |
| 2003/0184449 | A1 | 10/2003 | Baumgartner et al. |
| 2003/0217363 | A1 * | 11/2003 | Brady et al. ............... 725/76 |
| 2003/0233469 | A1 | 12/2003 | Knowlson et al. |
| 2003/0233658 | A1 | 12/2003 | Keen et al. |
| 2003/0237016 | A1 | 12/2003 | Johnson et al. |
| 2004/0001303 | A1 | 1/2004 | Doblar et al. |
| 2004/0054923 | A1 | 3/2004 | Seago et al. |
| 2004/0077308 | A1 | 4/2004 | Sanford et al. |
| 2004/0078821 | A1 * | 4/2004 | Frisco et al. ............... 725/76 |
| 2004/0088412 | A1 | 5/2004 | John et al. |
| 2004/0098745 | A1 | 5/2004 | Marston et al. |
| 2004/0108963 | A1 | 6/2004 | Clymer et al. |
| 2004/0111523 | A1 | 6/2004 | Hall et al. |
| 2004/0123322 | A1 | 6/2004 | Erkocevic et al. |
| 2004/0128688 | A1 | 7/2004 | Seo |
| 2004/0133634 | A1 | 7/2004 | Luke et al. |
| 2004/0139467 | A1 | 7/2004 | Rogerson et al. |
| 2004/0142658 | A1 | 7/2004 | McKenna et al. |
| 2004/0147243 | A1 | 7/2004 | McKenna |
| 2004/0167967 | A1 | 8/2004 | Bastian et al. |
| 2004/0183346 | A1 * | 9/2004 | Sanford et al. ............... 297/217.3 |
| 2004/0198346 | A1 | 10/2004 | Swensen et al. |
| 2004/0217234 | A1 * | 11/2004 | Jones et al. ............... 244/118.5 |
| 2004/0235469 | A1 * | 11/2004 | Krug ............... 455/431 |
| 2004/0252965 | A1 | 12/2004 | Moreno et al. |
| 2004/0252966 | A1 | 12/2004 | Holloway et al. |
| 2004/0253951 | A1 | 12/2004 | Chang et al. |
| 2005/0021602 | A1 * | 1/2005 | Noel et al. ............... 709/203 |
| 2005/0026608 | A1 | 2/2005 | Kallio et al. |
| 2005/0027787 | A1 | 2/2005 | Kuhn et al. |
| 2005/0039208 | A1 | 2/2005 | Veeck et al. |
| 2005/0044564 | A1 * | 2/2005 | Stopniewicz et al. ............... 725/37 |
| 2005/0067530 | A1 | 3/2005 | Schafer, Jr. et al. |
| 2005/0114894 | A1 | 5/2005 | Hoerl |
| 2005/0132407 | A1 * | 6/2005 | Boyer et al. ............... 725/77 |
| 2005/0136917 | A1 | 6/2005 | Taylor |
| 2005/0138654 | A1 | 6/2005 | Minne |
| 2005/0167546 | A1 * | 8/2005 | Jones et al. ............... 244/118.5 |
| 2005/0176368 | A1 | 8/2005 | Young et al. |
| 2005/0177763 | A1 | 8/2005 | Stoler |
| 2005/0181723 | A1 | 8/2005 | Miller et al. |
| 2005/0193257 | A1 | 9/2005 | Stoler |
| 2005/0202785 | A1 | 9/2005 | Meyer |
| 2005/0215249 | A1 | 9/2005 | Little et al. |
| 2005/0216938 | A1 | 9/2005 | Brady, Jr. et al. |
| 2005/0239261 | A1 | 10/2005 | Tai et al. |
| 2005/0251798 | A1 | 11/2005 | Fraley |
| 2005/0256616 | A1 | 11/2005 | Rhoads |

(56) References Cited

U.S. PATENT DOCUMENTS

| | | | |
|---|---|---|---|
| 2005/0268319 A1* | 12/2005 | Brady, Jr. | 725/76 |
| 2005/0270373 A1 | 12/2005 | Trela | |
| 2005/0273823 A1 | 12/2005 | Brady, Jr. et al. | |
| 2005/0278753 A1 | 12/2005 | Brady, Jr. et al. | |
| 2005/0278754 A1* | 12/2005 | Bleacher et al. | 725/77 |
| 2005/0281223 A1 | 12/2005 | D'Annunzio | |
| 2006/0010438 A1 | 1/2006 | Brady, Jr. et al. | |
| 2006/0030311 A1 | 2/2006 | Cruz et al. | |
| 2006/0032979 A1 | 2/2006 | Mitchell et al. | |
| 2006/0040612 A1 | 2/2006 | Min | |
| 2006/0040660 A1 | 2/2006 | Cruz et al. | |
| 2006/0044214 A1 | 3/2006 | Hong | |
| 2006/0048196 A1 | 3/2006 | Yau | |
| 2006/0088001 A1 | 4/2006 | Reitmann et al. | |
| 2006/0107295 A1* | 5/2006 | Margis et al. | 725/81 |
| 2006/0128303 A1 | 6/2006 | Schedivy | |
| 2006/0143662 A1 | 6/2006 | Easterling et al. | |
| 2006/0154601 A1 | 7/2006 | Tewalt et al. | |
| 2006/0174285 A1 | 8/2006 | Brady, Jr. et al. | |
| 2006/0183450 A1 | 8/2006 | Cameron | |
| 2006/0187959 A1 | 8/2006 | Kawaguchi et al. | |
| 2006/0197750 A1* | 9/2006 | Kerr et al. | 345/173 |
| 2006/0212909 A1 | 9/2006 | Girard et al. | |
| 2006/0217121 A1 | 9/2006 | Soliman et al. | |
| 2006/0234700 A1 | 10/2006 | Funderburk et al. | |
| 2006/0250947 A1 | 11/2006 | Allen | |
| 2006/0264173 A1 | 11/2006 | Gilbert | |
| 2006/0270373 A1 | 11/2006 | So | |
| 2006/0270470 A1 | 11/2006 | de La Chapelle et al. | |
| 2006/0276127 A1 | 12/2006 | Cruz et al. | |
| 2006/0277589 A1 | 12/2006 | Margis et al. | |
| 2006/0291803 A1 | 12/2006 | Watson et al. | |
| 2006/0293190 A1 | 12/2006 | Watson et al. | |
| 2007/0021117 A1 | 1/2007 | McKenna et al. | |
| 2007/0022018 A1 | 1/2007 | Suryanarayana et al. | |
| 2007/0025240 A1 | 2/2007 | Snide | |
| 2007/0042772 A1 | 2/2007 | Salkini et al. | |
| 2007/0044126 A1 | 2/2007 | Mitchell | |
| 2007/0060133 A1 | 3/2007 | Spitzer et al. | |
| 2007/0130599 A1 | 6/2007 | Monroe | |
| 2007/0155381 A1 | 7/2007 | Alberth et al. | |
| 2007/0155421 A1 | 7/2007 | Alberth et al. | |
| 2007/0185977 A1 | 8/2007 | Sato | |
| 2007/0202802 A1 | 8/2007 | Kallio et al. | |
| 2007/0213009 A1 | 9/2007 | Higashida et al. | |
| 2007/0258417 A1 | 11/2007 | Harvey et al. | |
| 2007/0298741 A1 | 12/2007 | Harnist et al. | |
| 2008/0004016 A1 | 1/2008 | Smee et al. | |
| 2008/0023600 A1* | 1/2008 | Perlman | 248/128 |
| 2008/0040756 A1* | 2/2008 | Perlman et al. | 725/75 |
| 2008/0084882 A1 | 4/2008 | Eruchimovitch | |
| 2008/0085691 A1 | 4/2008 | Harvey et al. | |
| 2008/0090567 A1 | 4/2008 | Gilbert | |
| 2008/0124054 A1 | 5/2008 | Bonar | |
| 2008/0125112 A1 | 5/2008 | Clarke et al. | |
| 2008/0127278 A1 | 5/2008 | Bonar | |
| 2008/0130539 A1 | 6/2008 | Lauer et al. | |
| 2008/0132212 A1 | 6/2008 | Lemond et al. | |
| 2008/0133705 A1 | 6/2008 | Lemond et al. | |
| 2008/0141314 A1 | 6/2008 | Lemond et al. | |
| 2008/0181169 A1 | 7/2008 | Lauer et al. | |
| 2008/0182573 A1 | 7/2008 | Lauer et al. | |
| 2008/0274734 A1 | 11/2008 | Kostanic et al. | |
| 2008/0299965 A1 | 12/2008 | Lagerman | |
| 2008/0305762 A1 | 12/2008 | Malosh | |
| 2009/0007193 A1 | 1/2009 | Correa et al. | |
| 2009/0010200 A1 | 1/2009 | Lauer et al. | |
| 2009/0042651 A1 | 2/2009 | Prabhu et al. | |
| 2009/0112377 A1* | 4/2009 | Schalla et al. | 701/3 |
| 2010/0162326 A1 | 6/2010 | Bonar | |
| 2010/0187354 A1* | 7/2010 | Helfrich | 244/118.5 |
| 2010/0252680 A1* | 10/2010 | Porter | 244/118.6 |

FOREIGN PATENT DOCUMENTS

| | | |
|---|---|---|
| CN | ZL200520103236.4 | 12/2006 |
| DE | 102008016172 A1 | 10/2009 |
| EP | 0 577 054 A | 1/1994 |
| EP | 0 767 594 | 9/1997 |
| EP | 0 890 907 A1 | 1/1999 |
| EP | 0 930 513 | 7/1999 |
| EP | 1 078 852 A | 2/2001 |
| EP | 1 217 833 A2 | 6/2002 |
| EP | 1 231 534 A1 | 8/2002 |
| EP | 1 217 833 A3 | 4/2004 |
| EP | 1 458 590 B | 6/2005 |
| JP | 58-46485 | 3/1983 |
| JP | 62-238693 | 10/1987 |
| JP | H06-285259 A | 10/1994 |
| JP | H09-512401 A | 11/1995 |
| JP | 2003-534959 A | 4/2000 |
| JP | 2002-26837 A | 1/2002 |
| JP | 2002-77084 A | 3/2002 |
| JP | 2002-77174 A | 3/2002 |
| JP | 2003-140804 A | 5/2003 |
| JP | 2004-80447 A | 3/2004 |
| JP | 2004-194059 A | 7/2004 |
| JP | 2004-343744 A | 12/2004 |
| JP | 2005-018230 A | 1/2005 |
| JP | 2005-045490 A | 2/2005 |
| JP | 2005-508098 A | 3/2005 |
| JP | 2005-528030 A | 9/2005 |
| JP | 2006-527540 A | 11/2006 |
| JP | 2007-195830 A | 8/2007 |
| WO | WO 99/14655 A | 3/1999 |
| WO | WO 99/31821 A | 6/1999 |
| WO | WO 00/14987 A1 | 3/2000 |
| WO | WO 02/15582 A | 2/2002 |
| WO | WO 02/015582 A1 | 2/2002 |
| WO | WO 02/084971 | 10/2002 |
| WO | WO 03/024110 A1 | 3/2003 |
| WO | WO 03/032503 A2 | 4/2003 |
| WO | WO 03/050000 A1 | 6/2003 |
| WO | WO 03/024085 A | 8/2003 |
| WO | WO 2004/003696 A2 | 1/2004 |
| WO | WO 2004/008277 A2 | 1/2004 |
| WO | WO 2005/029855 A | 3/2005 |
| WO | WO 2005/086865 A | 9/2005 |
| WO | WO 2005/120068 A3 | 12/2005 |
| WO | WO 2006/052941 A | 5/2006 |
| WO | WO 2006/065381 A2 | 6/2006 |
| WO | WO 2006/077686 A1 | 7/2006 |
| WO | WO 2007/035739 A2 | 3/2007 |

OTHER PUBLICATIONS

Gratschew, S., et al., "A Multimedia Messaging Platform for Content Delivering", IEEE 2003, pp. 431-435.
Ibenthal, A., et al.,"Multimedia im Fahrzeug: Dienste und Technik", Fernseh und Kino-Technik 54, Jahrgang Nr. Mar. 2000, pp. 100-105.
Anonymous: "ARC-3901 Aspect Ratio Converter Modules—Installation and Operation Manual" Internet Article, [Online] Mar. 18, 2003, pp. 1-162, XP02406139, retrieved from the Internet: URL:http://www.leitch.com/custserv/doclib.nsf/disweb?OpenForm &query=ARC-3901> [retrieved on Nov. 7, 2006].
Kirby, M., "Run Way Girl", http://www.flightglobal.com/blogs/runway-girl/2010/08/pinnacle-seat-is-bes-hottest-e.html, Aug. 2, 2010.
Kartalopoulos, S.V., "Consumer Communications in the Next Generation Access Network", Consumer Communications and Networking Conference, 2004, CCNC 2004. First IEEE Las Vegas, NV, USA Jan. 5-8, 2004, Piscataway, NJ (Jan. 5, 2004), pp. 273-278.
Ferries, Mark et al., "Optical Branching Devices for Avionic Passive Optical Network", Avionics, Fiber-Optics and Photonics Technology Conference, 2007 IEEE, IEEE, PI, Oct. 1, 2007 (Oct. 1, 2007), pp. 76-77.
Office Action, Japanese Application No. 2009-523977, Jul. 17, 2012.
Office Action, Appl. No. 200880107132.7, Jul. 22, 2011.
Notice of Allowance, U.S. Appl. No. 09/811,317, Jul. 14, 2003.
Office Action, U.S. Appl. No. 09/811,317, filed Feb. 28, 2002.
Office Action, U.S. Appl. No. 09/811,317, filed Aug. 13, 2002.

(56) References Cited

OTHER PUBLICATIONS

Office Action, U.S. Appl. No. 09/811,317, filed Dec. 30, 2002.
Notice of Allowance, U.S. Appl. No. 08/863,448, Feb. 17, 1999.
Office Action, U.S. Appl. No. 08/479,654, filed Jan. 24, 1997.
Office Action, U.S. Appl. No. 08/479,654, filed Mar. 1, 1996.
Office Action, U.S. Appl. No. 08/863,448, filed Apr. 27, 1998.
Office Action, U.S. Appl. No. 08/479,654, filed Aug. 5, 1997.
Office Action, U.S. Appl. No. 08/479,654, filed Aug. 21, 1995.
Office Action, U.S. Appl. No. 08/863,448, filed Sep. 24, 1997.
Office Action, Appl. No. 2004-199893, Jul. 5, 2005.
Office Action, Appl. No. 2006-000840, Feb. 28, 2007.
Office Action, U.S. Appl. No. 08/071,218, filed Apr. 20, 1995.
Notice of Allowance, U.S. Appl. No. 08/071,218, Aug. 7, 1995.
Office Action, U.S. Appl. No. 08/071,218, filed Dec. 7, 1994.
Office Action, U.S. Appl. No. 08/480,666, filed Sep. 5, 1996.
Office Action, U.S. Appl. No. 08/480,666, filed Feb. 9, 1996.
Office Action, U.S. Appl. No. 08/480,666, filed Oct. 16, 1996.
Office Action, U.S. Appl. No. 08/480,666, filed Nov. 22, 1996.
Office Action, U.S. Appl. No. 10/773,523, filed Oct. 5, 2006.
Office Action, Appl. No. 2004251677, Sep. 26, 2008.
Office Action, Appl. No. 04 754 296.4-1241, Apr. 4, 2007.
Office Action, U.S. Appl. No. 10/772,565, filed Mar. 4, 2009.
Office Action, U.S. Appl. No. 10/772,565, filed Jul. 7, 2010.
Office Action, U.S. Appl. No. 10/772,565, filed Nov. 24, 2009.
Int'l Search Report, Appl. No. PCT/US2004/017666, Feb. 4, 2005.
Notice of Allowance, U.S. Appl. No. 11/277,896, Oct. 23, 2009.
Office Action, U.S. Appl. No. 11/277,896, filed Apr. 14, 2009.
Office Action, Appl. No. 06 740 274.3-2416, Jan. 31, 2008.
Office Action, Appl. No. 06 740 274.3-2416, Sep. 17, 2008.
Office Action, Appl. No. 06 740 274.3-2416, Mar. 20, 2009.
Office Action, Appl. No. PCT/US2006/012067, Aug. 9, 2006.
Office Action, Appl. No. PCT/US2006/012067, Oct. 11, 2007.
Office Action, Appl. No. 05 749 692.9-1525, Jun. 7, 2010.
Office Action, Appl. No. 05 749 692.9-1525, Jun. 15, 2007.
Office Action, Appl. No. 05 749 692.9-1525, Oct. 22, 2008.
Office Action, U.S. Appl. No. 11/123,327, filed Jan. 6, 2010.
Office Action, U.S. Appl. No. 11/123,327, filed Jul. 20, 2010.
Office Action, U.S. Appl. No. 11/123,327, filed Oct. 14, 2009.
Office Action, U.S. Appl. No. 11/123,327, filed Dec. 11, 2008.
Int'l. Search Report, Appl. No. PCT/US2005/016513, Aug. 9, 2005.
Int'l. Search Report, Appl. No. PCT/US2005/016513, Nov. 16, 2006.
Office Action, U.S. Appl. No. 11/154,749, filed Jan. 23, 2009.
Office Action, U.S. Appl. No. 11/154,749, filed Aug. 18, 2008.
Office Action, Appl. No. 05 762 201.1-2202, May 18, 2007.
Office Action, Appl. No. 05 762 201.1-2202, Jul. 18, 2008.
Office Action, U.S. Appl. No. 11/154,749, filed Jun. 7, 2010.
Office Action, U.S. Appl. No. 11/154,749, filed Oct. 26, 2009.
Int'l Prel. Report, App. No. PCT/US2005/021518, Jan. 4, 2007.
Int'l. Search Report, App. No. PCT/US2005/021518, Jan. 3, 2006.
Notice of Allowance, U.S. Appl. No. 11/269,378, Jan. 5, 2010.
Office Action, U.S. Appl. No. 11/269,378, filed Apr. 28, 2009.
Office Action, U.S. Appl. No. 11/269,378, filed Aug. 20, 2008.
Int'l. Prel. Report, Appl. No. PCT/US2005/040380, May 18, 2007.
Int'l. Search Report, Appl. No. PCT/US2005/040380, Mar. 15, 2006.
Office Action, U.S. Appl. No. 11/379,360, filed Aug. 25, 2010.
Office Action, U.S. Appl. No. 11/379,360, filed Nov. 23, 2009.
Office Action, U.S. Appl. No. 11/379,360, filed Apr. 3, 2009.
Int'l Prel. Report, Appl. No. PCT/US2006/014852, Nov. 1, 2007.
Int'l Search Report, Appl. No. PCT/US2006/014852, Dec. 4, 2006.
Office Action, Appl. No. 07 813 357 6.1523, Sep. 29, 2009.
Int'l. Prel. Report, Appl. No. PCT/US2007/074367, Feb. 5, 2009.
Int'l. Search Report, Appl. No. PCT/US2007/074367, Dec. 17, 2007.
Office Action, U.S. Appl. No. 11/828,193, filed Nov. 30, 2009.
Int'l. Search Report, Appl. No. PCT/US2007/075448, Jul. 4, 2008.
Int'l. Prel. Report, Appl. No. PCT/US2008/076281, Mar. 25, 2010.
Int'l. Search Report, Appl. No. PCT/US2008/076281, Jan. 13, 2009.
Int'l. Prel. Report, Appl. No. PCT/US2008/076285, Mar. 25, 2010.
Int'l. Search Report, Appl. No. PCT/US2008/076285, Dec. 30, 2008.
Int'l. Prel. Report, Appl. No. PCT/US2008/076290, Mar. 25, 2010.
Int'l. Search Report, Appl. No. PCT/US2008/076290, Jan. 30, 2009.
Int'l. Prel. Report, Appl. No. PCT/US2008/076294, Mar. 25, 2010.
Int'l. Search Report, Appl. No. PCT/US2008/076294, Dec. 29, 2008.
Int'l. Prel. Report, Appl. No. PCT/US2008/077562, Apr. 1, 2010.
Int'l. Search Report, Appl. No. PCT/US2008/077562, Jun. 12, 2009.
Int'l. Prel. Report, Appl. No. PCT/US2008/078838, Apr. 15, 2010.
Int'l. Search Report, Appl. No. PCT/US2008/078838, Jan. 16, 2009.
Int'l. Prel. Report, Appl. No. PCT/US2009/033421, Aug. 19, 2010.
Int'l. Search Report, Appl. No. PCT/US2009/033421, Jun. 16, 2009.
Office Action, U.S. Appl. No. 11/086,510, filed Jul. 9, 2008.
Office Action, Appl. No. 09708647.4-2415, Sep. 23, 2010.
Office Action, Chinese Application No. 200780029616.X, Nov. 2, 2012.
Office Action, EP Application No. 08 830 787.1, Dec. 9, 2011.
Office Action, CN Appln No. 200880115267.8, Dec. 24, 2012.
Office Action, JP Appln No. 2010-525047, Dec. 25, 2012.
Office Action, JP Appln No. 2010-525045, Mar. 5, 2013.
Office Action, JP Appln No. 2010-525046, Mar. 5, 2013.
Office Action, CN Appln No. 20880107089.4, Mar. 7, 2013.
Office Action, Japanese Application No. 2010-525043, May 7, 2013.
Office Action, Chinese Application No. 200880107132.7, Jun. 7, 2013.
International Search Report, PCT/US2010/051231, Jun. 14, 2011.
200880117151.8 Office Action with English translation, Aug. 24, 2012.
2010-527121 Office Action with English translation, Jul. 12, 2012.
Office Action, CN Appln No. 200880115267.8, Jul. 8, 2013.
Office Action, JP Appln No. 2010-528188 Mar. 26, 2013.
Office Action, JP Appln No. 2010-527121 Apr. 2, 2013.
Office Action, CN Appln No. 200780029616.X, Apr. 17, 2013.
Office Action, Japanese Application No. 2013-240916, Oct. 28, 2014.

* cited by examiner

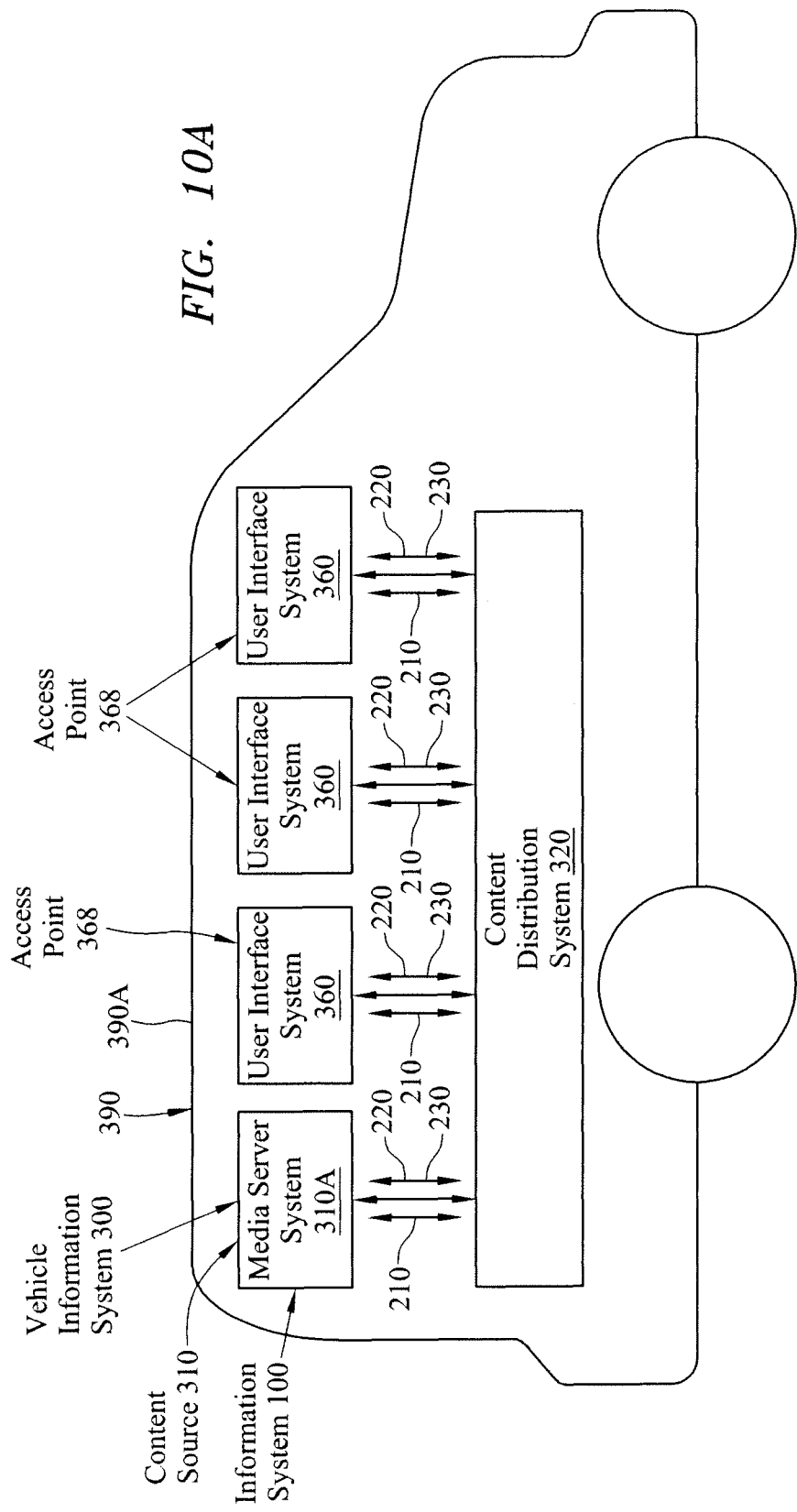

SYSTEM AND METHOD FOR PROVIDING AN INTEGRATED USER INTERFACE SYSTEM AT A SEAT

CROSS-REFERENCE TO RELATED APPLICATIONS

This application claims priority to: U.S. Provisional Application Ser. No. 61/278,166, filed on Oct. 2, 2009; and U.S. Provisional Application Ser. No. 61/340,627, filed on Mar. 19, 2010. Priority to these provisional applications is expressly claimed, and the disclosures of respective provisional applications are hereby incorporated by reference in their entireties and for all purposes.

FIELD

The present disclosure relates generally to integrated electronic systems and more particularly, but not exclusively, to integrated user interface systems for disposal at user seats.

BACKGROUND

Passenger vehicles, such as automobiles and aircraft, often include vehicle information systems for satisfying passenger demand for access to viewing content, such as entertainment, information content, or other viewing content, while traveling.

Conventional vehicle information (or entertainment) systems typically include overhead cabin video systems or seat-based video systems with individual controls such that viewing content is selectable by the passengers. The viewing content can include audio and video content that is derived from a variety of content sources. Prerecorded viewing content, such as motion pictures and music, can be provided by internal content sources, such as audio and video players, that are installed aboard the vehicle. The conventional vehicle information systems likewise can include an antenna system for receiving viewing content, such as live television programming and/or Internet content, transmitted from one or more content providers (or sources) that are external to, and/or remote from, the vehicle.

Such vehicle information systems, however, suffer from numerous disadvantages. Conventional vehicle information systems, for example, are very complex and include a large number of discrete system components. FIG. 1 illustrates a conventional vehicle information system 300, wherein various system components 361 associated with a distribution system of the vehicle information system 300 are provided as discrete components. Each of the discrete system components 361 requires individual mounting when installed throughout a passenger vehicle and typically do not blend with the aesthetics of the passenger cabin, emphasizing their appearance as add-on components. An intricate network of cables (not shown) also must be installed to provide interconnections among the discrete system components 361. The resultant vehicle information system 300 therefore is heavy, difficult to install, and hard to maintain. Furthermore, operation of the distributed system components 361 requires a significant amount of power and generates heat that must be cooled or otherwise dissipated, increasing an amount of fuel consumed by the passenger vehicle.

As shown in FIG. 1, the system components 361 includes user interface and other system components associated with the distribution system. The system components 361 typically are installed at various regions above, below, and within a passenger seat of the passenger vehicle. The user interface system 360, for example, includes a video interface system 362, an audio interface system 364, an input system 366, and an access point 368 that are individually installed within an seatback and one or both armrests of the passenger seat. Installation of the user interface system components 361 and the associated electrical interconnections at the passenger seat requires the passenger seat to be large despite a cramped passenger cabin and generates heat within the passenger seat, resulting in passenger discomfort.

Some of the disadvantages associated with existing user interface systems can be addressed by incorporating multiple system components into an integrated user interface system at the passenger seat. An integrated interface, for example, may incorporate a touchscreen video display, which allows for at least some of the functions of the user interface system to be provided directly on the display screen rather than by separate controls. The user interface system likewise may incorporate other system components, such as a card reader to allow purchases to be made using credit or debit cards, other user controls, and one or more connection points such as an audio connector and an access point. A problem with integrating such functions within the close confines of the passenger seat is that the touchscreen video display could be accidentally activated when performing an action that relates to these other integrated functions, such as when plugging or unplugging headphones or when inserting, swiping or removing a payment card.

A further problem with integrating more functions into a single user interface system at a passenger seat is that additional heat may be generated in a smaller volume, particularly when the display screen of the user interface system is advantageously made as large as possible. The overall size of the user interface system is necessarily restricted by the available space on the back of a passenger seat. For aircraft seatback applications in particular, the available space may be very limited, and the opportunity for heat dissipation consequently severely restricted.

In view of the foregoing, a need exists for an improved vehicle information system and method for integrating user interface and other system components in an effort to overcome the aforementioned obstacles and deficiencies of conventional vehicle information systems.

BRIEF DESCRIPTION OF THE DRAWINGS

FIG. 10A is an exemplary top-level drawing illustrating the information system of FIG. 2, wherein the information system is installed aboard an automobile.

Figure 1:
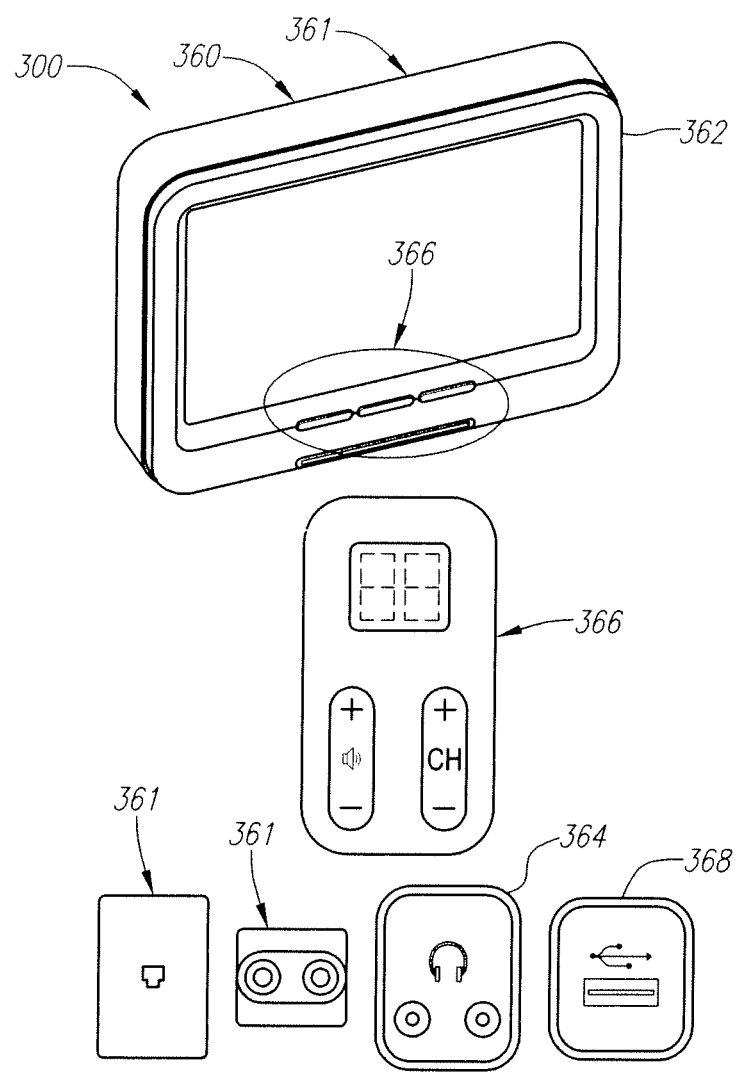
FIG. 1 is a drawing illustrating a conventional vehicle information system, wherein various system components of the vehicle information system are provided as discrete system components that require individual mounting and interconnections when installed throughout a passenger vehicle.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available vehicle information systems include a large number of discrete system components that are distributed throughout the passenger vehicle, do not blend with passenger cabin aesthetics, are difficult to install, are hard to remove, require a significant amount of power, generate heat, and increase the physical size of passenger seats, an information system that integrates multiple discrete system components into an integrated system module can prove desirable and provide a basis for a wide range of system applications, such as vehicle information systems for use aboard automobiles, aircraft, and other types of vehicles during travel. This result can be achieved, according to one embodiment disclosed herein, by a compact, light-weight, and low-power integrated system module 360' as illustrated in FIG. 2.

Figure 2:
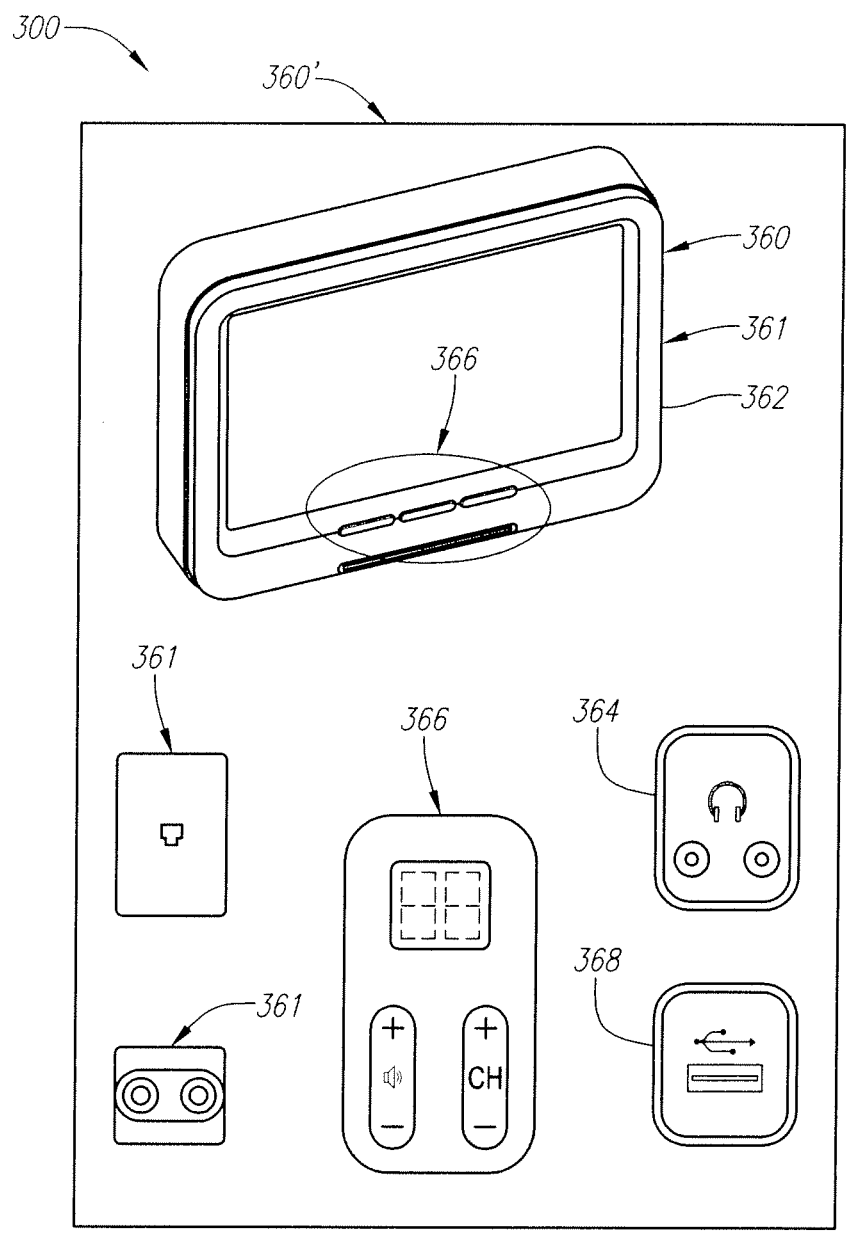
FIG. 2 is an exemplary top-level drawing illustrating an embodiment of an integrated system module for an information system, wherein selected discrete system components of the information system are integrated to form the integrated system module.
Figure 10B:
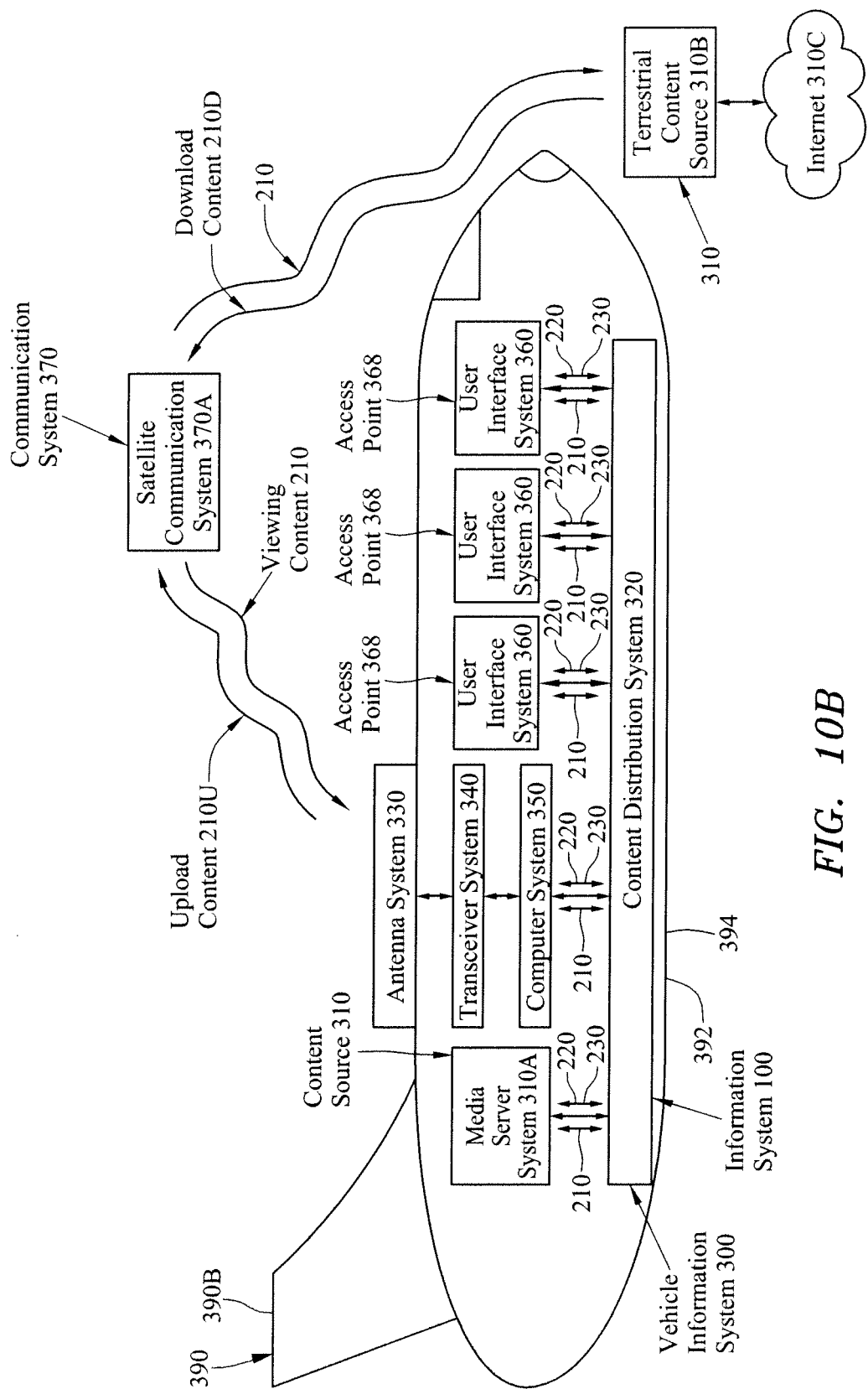
FIG. 10B is an exemplary top-level drawing illustrating an alternative embodiment of the information system of FIG. 2, wherein the information system is installed aboard an aircraft.

Turning to FIG. 2, the integrated system module 360' is shown as comprising a plurality of selected discrete system components 361 (and/or selected functions associated with the selected system components 361) of an information system, such as a computer network system disposed at a fixed location and/or a vehicle information system 300 suitable for installation aboard a passenger vehicle 390 (shown in FIGS. 10A-B). The integrated system module 360' preferably provides mechanical support as well as electrical interconnections (not shown) for the selected system components 361 and thereby, when properly installed, can provide the functions associated with the selected system components 361. Advantageously, the selected system components 361 (and/or the associated system component functions) can be installed in the information system simply by installing the integrated system module 360' in the information system.

The integrated system module 360' can be provided with any appropriate shape, dimension, and/or configuration for installation at any suitable location within an operating environment of a selected information system. If intended for installation aboard a passenger vehicle 390 (shown in FIGS. 10A-B), the integrated system module 360' can be installed at any suitable location, such as a wall 396, a ceiling, a floor, a bulkhead, and/or a user (or passenger) seat 382, within the passenger cabin 380 (collectively shown in FIGS. 12A-B). The system components 361 thereby can include user (or passenger) interface and other system components associated with a distribution system 320 (shown in FIGS. 10A-B and 11) of the information system. The user (or passenger) interface system 360 enables a user (or passenger) 900 (shown in FIG. 8A) to interact with the information system resources of the vehicle information system 300 via the distribution system 320.

The integrated system module 360' preferably is self-contained and includes an external power connection and/or a network connection for communicating with the vehicle information system 300. The external power connection is configured to receive operating power from the distribution system 320 (shown in FIGS. 10A-B and 11) of the vehicle information system 300. In one embodiment, the integrated system module 360' includes a power management and conditioning system (not shown) for conditioning the operating power received from the vehicle information system 300. The network connection likewise can provide an interface for exchanging command and/or media content information with the distribution system 320. The integrated system module 360' can decode the received media content information, perform a resolution conversion on the decoded media content, and present the converted media content. A display driver can enable the converted media content to be presented via a pushbutton and/or or touchscreen user interface.

The user interface can provide a graphical user interface and/or a hierarchical menu structure for navigating and/or accessing the content and other applications, such interactive game play, interactive maps, and/or shopping, available from the vehicle information system 300. Advantageously, the graphical user interface and/or a hierarchical menu structure can be fully programmable, supporting multiple languages and/or interface/menu customization. Alternatively, and/or additionally, the integrated system module 360' can include one or more front panel connections for coupling the integrated system module 360' with headphones, a personal media player, a Universal Serial Bus (USB) flash drive, or any other type of conventional peripheral device. If installed aboard a passenger vehicle 390, the integrated system module 360' likewise can support vehicle-specific commands, including attendant call and other requests for service, such as food and/or beverage service.

Similarly, if the passenger vehicle 390 is divided into different passenger classes, the available content, features, and/or selected system components 361 (and/or the associated system component functions) can be the same, and/or different, among the integrated system modules 360'. A first integrated system module 360' associated with a first passenger class, for example, can provide access to premium content, features, and/or selected system components 361 (and/or the associated system component functions); whereas, a second integrated system module 360' associated with a second passenger class can provide limited access to standard content, features, and/or selected system components 361 (and/or the associated system component functions). In one embodiment, the second integrated system module 360' can provide access to the premium content, features, and/or selected system components 361 (and/or the associated system component functions) upon receiving payment and other transaction information.

Exemplary user interface system components 361 can include any selected combination of one or more of a video interface system 362, an audio interface system 364, a user input system 366, at least one access point 368, a peripheral communication port, a peripheral power port, a proximity sensor system, a card reader system 361B (shown in FIG. 3), a portable control device port, and/or a telephone handset port, without limitation. As desired, two or more selected interface system components 361 (and/or the functions associated with the selected interface system components 361) can be combined into a composite interface system component 361 in any conventional manner. For example, the video interface system 362 is shown in FIG. 2 as including a plurality of control buttons that form a user input system 366. Additionally, and/or alternatively, the video interface system 362 and the user input system 366 can be combined in the form of a touchscreen display system.

The user interface system 360 can be provided in the manner set forth in the co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; entitled "SYSTEM AND METHOD FOR INTERFACING A PORTABLE MEDIA DEVICE WITH A VEHICLE INFORMATION SYSTEM," Ser. No. 12/210,624, filed on Sep. 15, 2008; entitled "MEDIA DEVICE INTERFACE SYSTEM AND METHOD FOR VEHICLE INFORMATION SYSTEMS," Ser. No. 12/210,636, filed Sep. 15, 2008; entitled "MEDIA DEVICE INTERFACE SYSTEM AND METHOD FOR VEHICLE INFORMATION SYSTEMS," Ser. No. 12/210,652, filed Sep. 15, 2008; and entitled "PORTABLE USER CONTROL DEVICE AND METHOD FOR VEHICLE INFORMATION SYSTEMS," Ser. No. 12/210,689, filed on Sep. 15, 2008, which are assigned to the assignee of the present application and the respective disclosures of which are hereby incorporated herein by reference in their entireties.

The integrated system module 360' can be installed within any suitable region of a selected passenger seat 382. Exemplary suitable regions can include a base 384B, a seatback 386, an armrest 388 (collectively shown in FIG. 12A) of the user seat 382. The integrated system module 360' likewise can be installed within a selected passenger seat 382 at any suitable time. In one embodiment, the integrated system module 360' can be preinstalled at the user seat 382 prior to installation of the user seat 382 aboard the passenger vehicle 390. The integrated system module 360' likewise can be preinstalled at the user seat 382 after the user seat 382 has been installed aboard the passenger vehicle 390. As needed, the integrated system module 360' can be removed from the user seat 382 for any purposes such as maintenance or other servicing. The removed integrated system module 360' thereby can readily be serviced and/or replaced by another integrated system module 360'.

Advantageously, the integrated system module 360' can support a clean, attractive industrial design by integrating the video interface system 362 and other selected system components 361, including the interconnections among the selected system components 361, into a seat frame and mechanism of the user seat 382. In other words, the integrated system module 360' advantageously can permit the vehicle information system 300 to be seamlessly integrated with the interior finish elements, such as the seatbacks 386 of the passenger seats 382, within the passenger cabin 380, delivering a premium entertainment experience for passengers traveling in all passenger classes, including passengers traveling in economy class. The resultant vehicle information system 300 can provide a passive and/or interactive entertainment experience during travel aboard the passenger vehicle 390.

Although each selected system component 361 (and/or the associated selected system component function) preferably is integrated with the integrated system module 360', one or more external system component 361 (and/or the associated selected system component function) of the user interface system 360 can be disposed external to (and/or installed separately from) the integrated system module 360', as desired. In one embodiment, for example, at least one external system component 361 (and/or the associated system component function) can be installed at an armrest 388 (shown in FIGS. 12A-B) or another region of the user seat 382. Accordingly, the integrated system module 360' can comprise a plurality of the selected system components 361 (and/or the associated selected system component functions) of the user interface system 360.

Use of the integrated system module 360' within the vehicle information system 300 can present multiple advantages. For example, the integrated system module 360' can reduce an aggregate number of system components for the vehicle information system 300 as well as reduce a total number of system components (or line replaceable units (LRUs)) on a per-seat basis. Installation of the integrated system module 360' likewise can simplify the number and complexity of the wiring interconnections among the system components 361. Time and labor required for installation, removal, upgrading, and/or maintenance of the integrated system module 360' and/or the vehicle information system 300 as well as the associated costs thereby can be reduced.

By reducing the number of system components 361 and simplifying the wiring interconnections, an overall weight of the vehicle information system 300 also can be reduced. Reduced system weight, in turn, can lead to other advantages for the vehicle information system 300 and/or passenger vehicle 390, including improved vehicle fuel economy, reduced vehicle emissions, increased vehicle payload, increased passenger legroom (and comfort during travel), improved system performance, improved safety, reduced power consumption, and/or other benefits. Further, only a single integrated system module 360', rather than multiple system components 361, needs to be ordered, shipped, and/or stored in inventory.

Furthermore, the fuel efficiency of the passenger vehicle 390 can be further improved because use of the integrated system module 360' likewise reduces overall system power consumption and heat generated by the vehicle information system 300. The integrated system module 360' can reduce overall system power consumption, for example, by including a video interface system 362 that comprises a low-power display system. Installation of the compact and low-power integrated system module 360' at the user seat 382 further enables a size (and/or shape and/or dimension) and weight of the user seat 382 to be reduced without causing passenger discomfort due to generated heat within the user seat 382.

Figure 3:
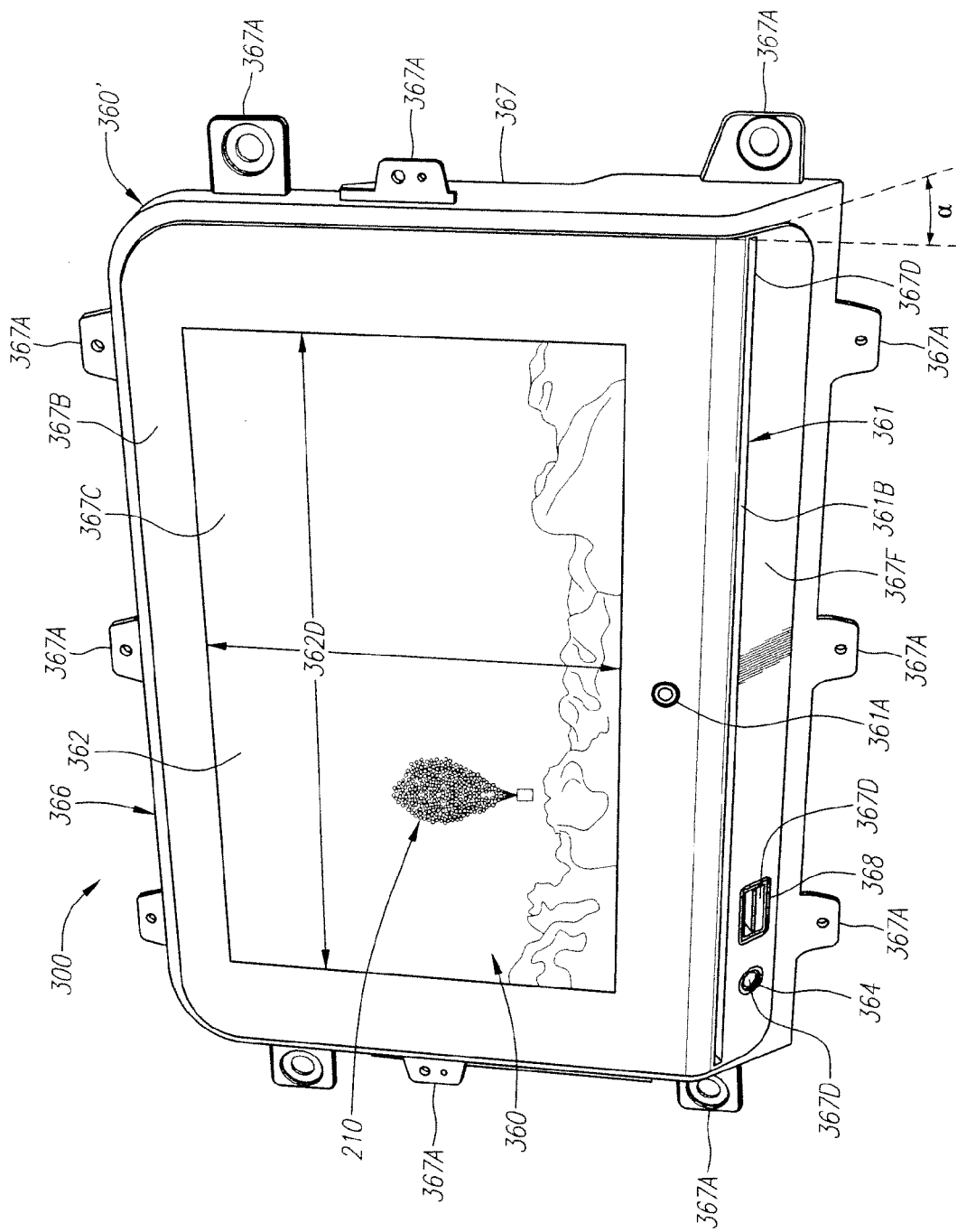
FIG. 3 is an exemplary detail drawing illustrating an embodiment of the integrated system module of FIG. 2, wherein the integrated system module is disposed within a module housing and configured for installation at a seatback of a selected user seat.

One embodiment of the integrated system module 360' is illustrated in FIG. 3. Turning to FIG. 3, the integrated system module 360' suitable for installation at a seatback 386 (shown in FIGS. 4A-B) of a passenger seat 382 (shown in FIGS. 4A-B). The integrated system module 360' can provide a user interface system 360 for enabling a user 900 (shown in FIG. 8A) to interact with the information system resources of the vehicle information system 300 in the manner set forth in more detail above with reference to FIG. 2. Advantageously, the user interface system 360 is disposed entirely at the seatback 386 of the user seat 382. Controls and other system components 361 (and/or the associated system component functions) thereby can be eliminated from an armrest 388 (shown in FIGS. 12A-B) and other regions of the user seat 382. In other words, user interaction with the vehicle information system 300 can be performed solely via the integrated user interface system 360 of the integrated system module 360'.

The integrated system module 360' can include any combination of conventional user interface system components 361 (and/or the associated system component functions). The user interface system 360 of FIG. 3, for example, is shown as including a video interface system 362. The video interface system 362 preferably comprises a light-weight, low-power video display system with a predetermined viewable area (and/or display (or screen) size) 362D and a thin profile. Exemplary video interface system 362 can include a liquid crystal display (LCD) system and/or an organic light emitting diode (OLED) system without limitation. In one embodiment, the video interface system 362 can include a low-power light emitting diode (LED) backlight. The viewable area 362D of the video interface system 362 can comprise any conventional display size with any suitable aspect ratio. The viewable area 362D, for example, can range between five inches (5") and seventeen inches (17") if measured diagonally. Exemplary diagonal measurements of the viewable area 362D can include seven inches (7"), nine inches (9"), and/or ten and six-tenths inches (10.6"); whereas, typical aspect ratios can include a 4:3 aspect ratio and a 16:9 aspect ratio.

The video interface system 362 can enable viewing content 210 and other information available from the vehicle information system 300 to be visually presented via the integrated system module 360'. As desired, the video interface system 362 can include front panel interactive controls and other electronics. Stated somewhat differently, the user input system 366 of the user interface system 360 can be at least partially integrated with the video interface system 362.

The video interface system 362 preferably comprises a touchscreen display system to reduce and/or eliminate mechanical push buttons from the integrated system module 360'. In one embodiment, the video interface system 362 comprises a capacitive touchscreen display system that includes a proximity sensor system (not shown) for detecting an approach of user hand (or finger) 910 (shown in FIG. 8A) prior to actual contact with the touchscreen display system. Stated somewhat differently, the user input system 366 can include one or more capacitive buttons. Use of the proximity sensor system and/or capacitive buttons can enable the user controls presented by the integrated system module 360' to be actuated prior to actual contact with the touchscreen controls. As desired, the proximity sensor system can be adapted to detect a user hand 910 adjacent to any relevant portion of the face panel 367B, in whole and/or in part. In one embodiment, the capacitive buttons and other user controls can be illuminated or otherwise emphasized when needed, such as when the presence of a user hand 910 is detected, and/or can be hidden from view or otherwise deemphasized when not needed. In one embodiment, the capacitive buttons and other user controls can be provided with multicolor illumination.

Figure 8A:
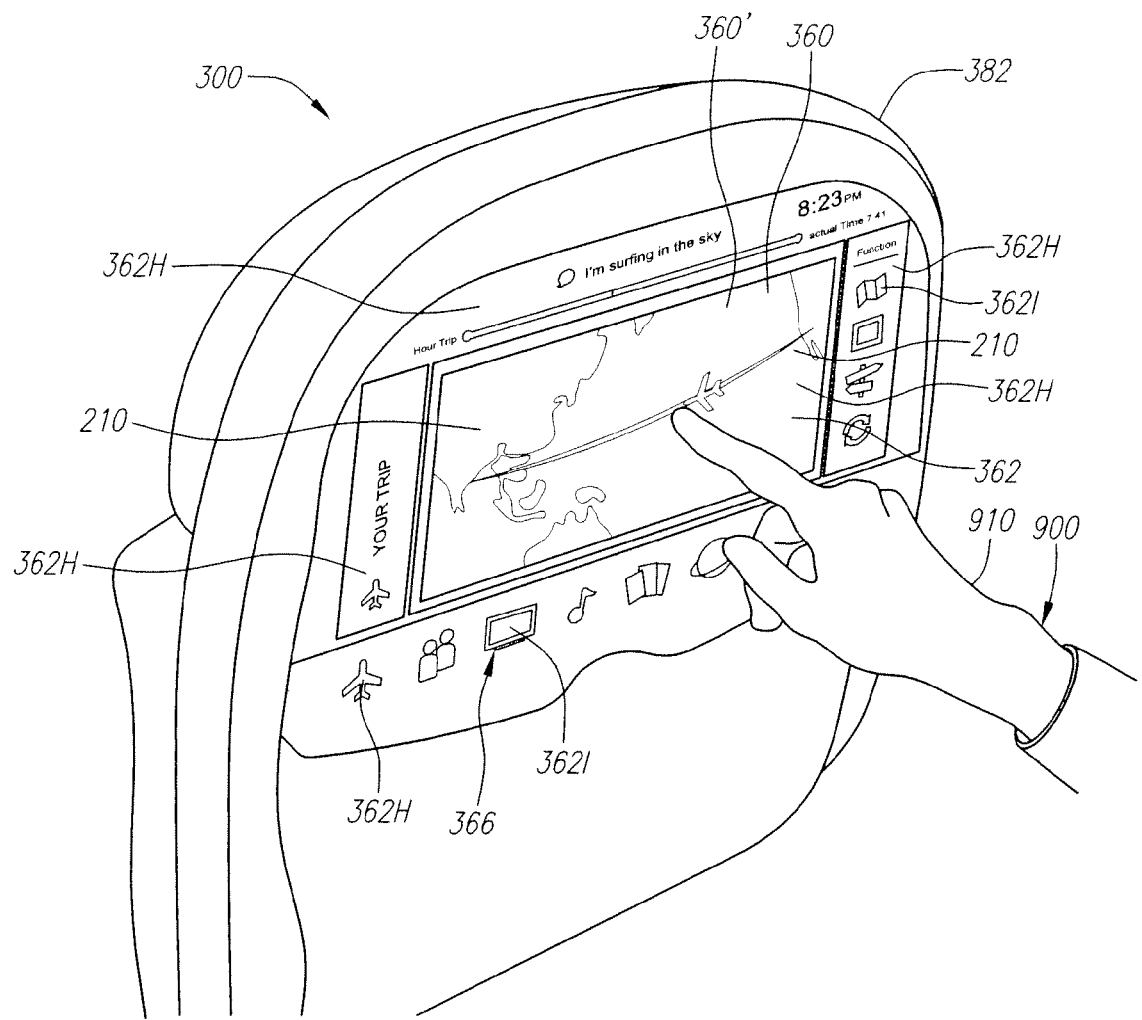
FIG. 8A is an exemplary detail drawing illustrating an alternative embodiment of the integrated system module of FIG. 2, wherein the integrated system module presents control indicia for navigating viewing content available via the information system.

Alternatively, and/or additionally, when the proximity sensor system detects the user hand 910, the video interface system 362 can present secondary control indicia 362I (shown in FIG. 8A), such as a secondary control menu and/or second control icon (or indicia) 362I (shown in FIG. 8A). The secondary control indicia 362I can enable a user 910 (shown in FIG. 8A) to select from among additional functionalities available via the vehicle information system 300. As desired, the video interface system 362 can superimpose the secondary control indicia 362I at least partially over other viewing content 210 being presented via the video interface system 362. In the manner shown in FIG. 8A, the viewable area 362D (shown in FIG. 3) of the video interface system 362 preferably is separated (or divided) into a plurality of viewing regions (or frames) 362H, wherein the viewing content 210 is presented within a first viewing region 362H and the secondary control indicia 362I is presented within a second viewing region 362H. Presentation of the secondary control indicia 362I thereby does not interfere with presentation of the viewing content 210.

As illustrated in FIG. 3, the integrated system module 360' likewise can include at least one audio port associated with the audio interface system 364 of the user interface system 360. The audio interface system 364 can enable an audio portion of the viewing content 210 and other information available from the vehicle information system 300 to be audibly presented via the integrated system module 360'. In one embodiment, the audio interface system 364 can include a plurality of audio ports to permit the audio portion of the selected viewing content 210 to be audibly presented to more than one user 900 (shown in FIG. 8A). Multiple users 900 thereby can simultaneously enjoy the audio portion of the selected viewing content 210 on individual sets of headphones.

Each of audio ports can be provided in any conventional manner, such as via a conventional audio connector and/or jack for removably coupling external audio devices, such as headphones and/or a (powered or unpowered) speaker system, with the integrated system module 360' in a wired manner. As desired, at least one of the audio ports can be provided as a wireless communication port that is configured to support a wireless audio peripheral presentation device, such as Bluetooth-capable wireless headphones in accordance with Institute of Electrical and Electronics Engineers (IEEE) Standard 802.15.1.

The audio interface system 364 likewise can process the audio portion of the selected viewing content 210 in any conventional manner. An illustrative process by which the audio interface system 364 can enhance the sound quality of the audio portion of the selected viewing content 210 can include three-dimensional audio processing to simulate surround sound. Thereby, the selected viewing content 210 can be audibly presented in surround sound via an ordinary speaker system and/or a set of ordinary headphones. The audio interface system 364 likewise can provide noise cancellation processing of the audio portion of the selected viewing content 210 to cancel any ambient noise from the audible presentation of the selected viewing content 210. The manner by which the audio interface system 364 processes the audio portion of the selected viewing content 210 preferably is user-controlled.

Advantageously, the integrated system module 360' can enable a conventional peripheral device, such as a personal media device 200 (shown in FIG. 12B) and/or a memory device, to communicate with the vehicle information system 300. Personal viewing content available from the personal media device 200 and/or the memory device thereby can be selected for presentation via the integrated system module 360'. Alternatively, and/or additionally, the personal media device 200 and the integrated system module 360' can alternately can utilized for controlling operation of predetermined functions of the vehicle information system 300, such as selecting among the available viewing content 210 and controlling presentation of the selected viewing content 210, and/or for presenting the selected viewing content 210.

In one embodiment, the integrated system module 360' can include an access point 368 for interfacing with the personal media device 200. The access point 368 can be provided in any conventional manner and can be adapted to support conventional wired and/or wireless communication with a selection of personal media devices 200 having a variety of communication agreements (or protocols). As desired, the access point 368 can include one or more communication ports (or connectors) each for supporting a selected connection agreement. Exemplary communication ports for the access point 368 can include a Universal Serial Bus (USB)-compatible communication port and/or a Deutsches Institut für Normung (DIN) type connector for communicating with an iPod® (iPhone®) digital electronic media device in the manner set forth in the above-referenced co-pending United States patent applications, entitled "SYSTEM AND METHOD FOR INTERFACING A PORTABLE MEDIA DEVICE WITH A VEHICLE INFORMATION SYSTEM," Ser. No. 12/210,624, filed on Sep. 15, 2008; entitled "MEDIA DEVICE INTERFACE SYSTEM AND METHOD FOR VEHICLE INFORMATION SYSTEMS," Ser. No. 12/210,636, filed Sep. 15, 2008; and entitled "MEDIA DEVICE INTERFACE SYSTEM AND METHOD FOR VEHICLE INFORMATION SYSTEMS," Ser. No. 12/210,652, filed Sep. 15, 2008. Exemplary memory devices can include a Universal Serial Bus (USB) flash drive.

As desired, one or more optional conventional user interface system components 361 (and/or the associated system component functions) can be incorporated into the integrated system module 360'. The integrated system module 360', for example, can include a proximity sensor system (not shown). The proximity sensor system can determine when a hand (or finger) 910 (shown in FIG. 8A) of a user 900 (shown in FIG. 8A) is near (or proximate to) the integrated system module 360' and prior to actual contact with the integrated system module 360'. More particularly, the proximity sensor system can sense the hand 910 when the hand 910 is within a few inches of the integrated system module 360'.

Upon determining that a hand 910 is near the integrated system module 360', the proximity sensor system can automatically initiate an appropriate response, such as activating and/or illuminating at least one selected system component 361 (and/or the associated system component functions), by the integrated system module 360'. The proximity sensor system (not shown), for instance, can illuminate a control (or service) menu, at least one control icon (or indicia) 362I (shown in FIG. 8A), touch point 361A, and/or other control button upon detecting the presence of a hand 910. In one embodiment, the proximity sensor system can provide a touch point 361A or other control button for activating and/or navigating the control (or service) menu.

The integrated system module 360' likewise can include an optional card reader system 361B for receiving payment and other transaction information. An availability of applications, system components 361 (and/or the associated system component functions), and other features offered by a selected integrated system module 360' can be uniform and/or different among the integrated system modules 360' installed aboard a passenger vehicle 390 (shown in FIGS. 10A-B). The system features offered by the selected integrated system module 360', for example, can be based upon one or more appropriate predetermined criteria, such as a passenger class or other subscription level assigned to an associated passenger seat 382. Based upon the service subscription level, one portion of the viewing content 210, such as standard viewing content 210, may be made available free of charge (and/or included with the service subscription level); whereas, other portions of the available viewing content 210, such as premium viewing content 210, may be available only for an additional fee. If access to the premium viewing content 210 is desired, transaction information, such as a credit card number and/or a frequent traveler number, can be entered by swiping an appropriate card (not shown) in the card reader system 361B.

In one preferred embodiment, the integrated system module 360' can assist the user 900 (shown in FIG. 8A) with operating the user interface system 360. The integrated system module 360', for example, can present selected capacitive buttons and other user controls only when needed. In other words, inactive (or unnecessary) user controls can be hidden from view. The integrated system module 360' likewise can illuminate or otherwise emphasize one or more selected system components 361 (and/or the associated system component functions) when the selected system components 361 are needed. A card slot opening of the card reader system 361B can be illuminated when the vehicle information system 300 requires payment or other transaction information.

Similarly, an audio connector of the audio interface system 364 and/or a communication port of the access point 368 can be illuminated when needed. As desired, one or more selected system components 361 (and/or the associated system component functions) can be illuminated in order to provide light to assist the user 900 (shown in FIG. 8A) with operating the selected system component 361, such as during a time when lighting within the operating environment (or passenger cabin) is dim. The proximity sensor system can be utilized to illuminate the selected system component 361, such as the audio interface system 364, the access point 368, and/or the card reader system 361B, when a user hand 910 (shown in FIG. 8A) approaches the selected system component 361.

Alternatively, and/or additionally, the system components 361 (and/or the associated system component functions) can be illuminated to provide a cue (or otherwise prompt) for the user 900 to take an appropriate action. Each selected system component 361 can be illuminated independently and/or in predetermined groups of selected system components 361 as desired. In one embodiment, the video interface system 362 can present a suitable animation for assisting the user with a selected system component 361. The animation can provide visual and/or audible instruction for using the selected system component 361. In the manner discussed herein, the video interface system 362 can superimpose the animation at least partially over other viewing content 210 being presented via the video interface system 362 and/or can present the animation and viewing content 210 via separate viewing regions 362H (shown in FIG. 8A).

Although the integrated system module 360' can be provided without a module housing, the integrated system module 360' preferably is disposed within a module housing 367. The module housing 367 advantageously can provide a thermal/heat sink function and/or electronic shielding, e.g. electromagnetic interference (EMI) containment, for the integrated system module 360'. The module housing 367 can be provided with any desired size (and/or shape and/or dimension) suitable for disposal within the seatback 386 of the user seat 382. Preferably, the module housing 367 is provided with a thin profile in an effort to minimize a thickness T (shown in FIGS. 7B-C) of the seatback 386 and/or an overall size (and/or shape and/or dimension) of the user seat 382.

To facilitate installation of the integrated system module 360', the module housing 367 is illustrated as including a plurality of module mounting regions 367A for cooperating with associated seat mounting regions (not shown) of the user seat 382. The seat mounting regions can be provided in any conventional manner, including in the manner discussed below with reference to the shroud mounting regions 387A (shown in FIG. 4B). As illustrated in FIG. 3, the module housing 367 can include several patterns of module mounting regions 367A to support installation of the integrated system module 360' within a variety of different user seats 382. Each pattern of module mounting regions 367A can be associated with one or more types of passenger seats 382. The module housing 367 can be mounted with the user seat 382 in any conventional manner, including directly and/or indirectly via, for example, a shroud 386A (shown in FIGS. 4A-B).

The module mounting regions 367A and the seat mounting regions can cooperate in any conventional manner. Whereas illustrated as being coupled via a plurality of fasteners, the module mounting regions 367A and the seat mounting regions can be coupled via one or more sets of cooperating detents, as desired. The term "detents" refers to any combination of mating elements, such as blocks, tabs, pockets, slots, ramps, locking pins, cantilevered members, support pins, and the like, that may be selectively or automatically engaged and/or disengaged to couple or decouple the module mounting regions 367A with the seat mounting regions. It will be appreciated that the cooperating detents as illustrated and described below are merely exemplary and not exhaustive.

The module housing 367 preferably enables user access to the system components 361 (and/or the associated system component functions) comprising the user interface system 360. For example, the module housing 367 can include a face panel 367B with a transparent panel region 367C for permitting viewing content 210 presented by the video interface system 362 to be visible outside the module housing 367. The transparent panel region 367C can be formed from any suitable transparent material, such as glass or plastic, that can be treated to reduce glare and/or to provide color tinting, as desired. Although preferably formed with a size (and/or shape and/or dimension) that is equal to a size (and/or shape and/or dimension) of the viewable area 362D of the video interface system 362, the transparent panel region 367C of the face panel 367B can be provided with any predetermined size (and/or shape and/or dimension) that can be greater than and/or less than the size (and/or shape and/or dimension) of the viewable area 362D of the video interface system 362. If the video interface system 362 comprises a touchscreen display system with the proximity sensor system in the manner discussed in more detail above, the touchscreen display system advantageously can be actuated through the face panel 367B and without actual contact with the touchscreen display system.

As desired, one or more apertures (and/or cut-outs and/or openings) 367D can be formed in the module housing 367 for supporting user access to the other system components 361 (and/or the associated system component functions) of the user interface system 360. In one embodiment, at least one of the apertures 367D can be formed the face panel 367B as shown in FIG. 3. FIG. 3 illustrates that the audio interface system 364 of the integrated system module 360' is disposed adjacent to the face panel 367B. If the audio interface system 364 includes a conventional audio connector (and/or jack), a first aperture 367D can be formed in the face panel 367B and associated with the audio connector. The first aperture 367D thereby can enable an audio plug of a headset or other external audio device to extend through the face panel 367B and be removably coupled with the audio jack of the audio interface system 364.

As illustrated in FIG. 3, the access point 368 of the integrated system module 360' can comprise wired access point 368, such as a Universal Serial Bus (USB)-compatible communication port, for coupling a personal media device 200 (shown in FIGS. 7A-C and 12B). The access point 368 is disposed adjacent to the face panel 367B, and a second aperture 367D can be formed in the face panel 367B and associated with the access point 368. The personal media device 200, for example, can communicate with the integrated system module 360' via a conventional communication cable assembly 369 (shown in FIGS. 7A-C). The communication cable assembly 369 comprises a communication cable that is terminated with a module communication connector 369A (shown in FIGS. 7A-C) for coupling with the integrated system module 360' and a device communication connector 369B (shown in FIGS. 7A-C) for coupling with the personal media device 200. The second aperture 367D can permit the module communication connector 369A to extend through the face panel 367B and to removably couple with the access point 368.

Similarly, the card reader system 361B of the integrated system module 360' is shown as being disposed adjacent to the face panel 367B. A third aperture 367D can be formed in the face panel 367B and associated with the card reader system 361B. The third aperture 367D preferably is aligned with a card slot opening of the card reader system 361B. Thereby, the third aperture 367D enables a relevant portion of a user card to be extended through the face panel 367B and to be received by the card slot opening such that transaction information and other data from the user card can be read by the card reader system 361B in the conventional manner. The card slot opening preferably is angled such that the user card, when inserted into the card slot opening, extends at an angle greater than ninety degrees (90°) compared with the face panel 367B. In one embodiment, the user card can extend from the card reader system 361B within any suitable angle range, such as any five-degree angle range, between one hundred, twenty degrees (120°) and one hundred, fifty degrees (150°). Although shown and described with reference to FIG. 3 as being associated with selected system components 361 of the user interface system 360 for purposes of illustration only, the apertures 367D can be formed in the module housing 367 for supporting user access to any system components 361 (and/or the associated system component functions) of the user interface system 360 as desired.

The port panel region 367F comprises a portion of the module housing 367 wherein the apertures 367D for the ports (or connectors) associated with the selected system components 361 (and/or the associated system component functions), such as the audio interface system 364, the access point 368, and/or the card reader system 361B, are formed and preferably is integrated with as shown in FIG. 3, but may be separate from, the face panel 367B of the module housing 367. The module housing 367 and/or the port panel region 367F preferably ensure sufficient displacement among the apertures 367D in order to inhibit interference among peripheral devices (and/or peripheral device cable assemblies, including any cable strain reliefs) when each of the system components 361 (and/or the associated system component functions) are being utilized by the user 900.

The port panel region 367F and the face panel 367B (and/or the transparent panel region 367C) advantageously can form a predetermined panel angle $\alpha$ for inhibiting physical interference that can result from use of the selected system components 361 of the integrated system module 360'. The panel angle $\alpha$ can comprise any suitable panel angle and preferably comprises a panel angle within a panel angle range, such as any five-degree panel angle range, between thirty-five degrees (35°) and fifty-five degrees (55°), including a panel angle $\alpha$ of forty-six degrees (46°) or forty-seven degrees (47°). The panel angle $\alpha$ thereby can help to ensure that sufficient space is provided for inhibiting interference among peripheral devices when each of the system components 361 (and/or the associated system component functions) are being utilized by the user 900. In one embodiment, the panel angle $\alpha$ advantageously inhibits inadvertent activation of the touchscreen video interface system 362 and/or the touch point 361A when other selected system components 361 (and/or the associated system component functions), such as the audio interface system 364, the access point 368, and/or the card reader system 361B, are being utilized.

Advantageously, the integrated system module 360' can be readily reconfigurable to provide any selected set of system components 361 (and/or the associated system component functions). The system components 361, for example, can be provided as interchangeable units. Thereby, the integrated system module 360' can be provided with a predetermined combination of component units for providing the desired system components 361 (and/or the associated system component functions). Stated somewhat differently, undesired (and/or malfunctioning) component units can be removed from the integrated system module 360' and replaced with desired (and/or functioning) component units. As desired, the face panel 367B (and/or a port panel region 367F) of the module housing 367 of the integrated system module 360' likewise can be replaced to conform the apertures 367D with the relevant system components 361 (and/or the associated system component functions).

Figure 4A:
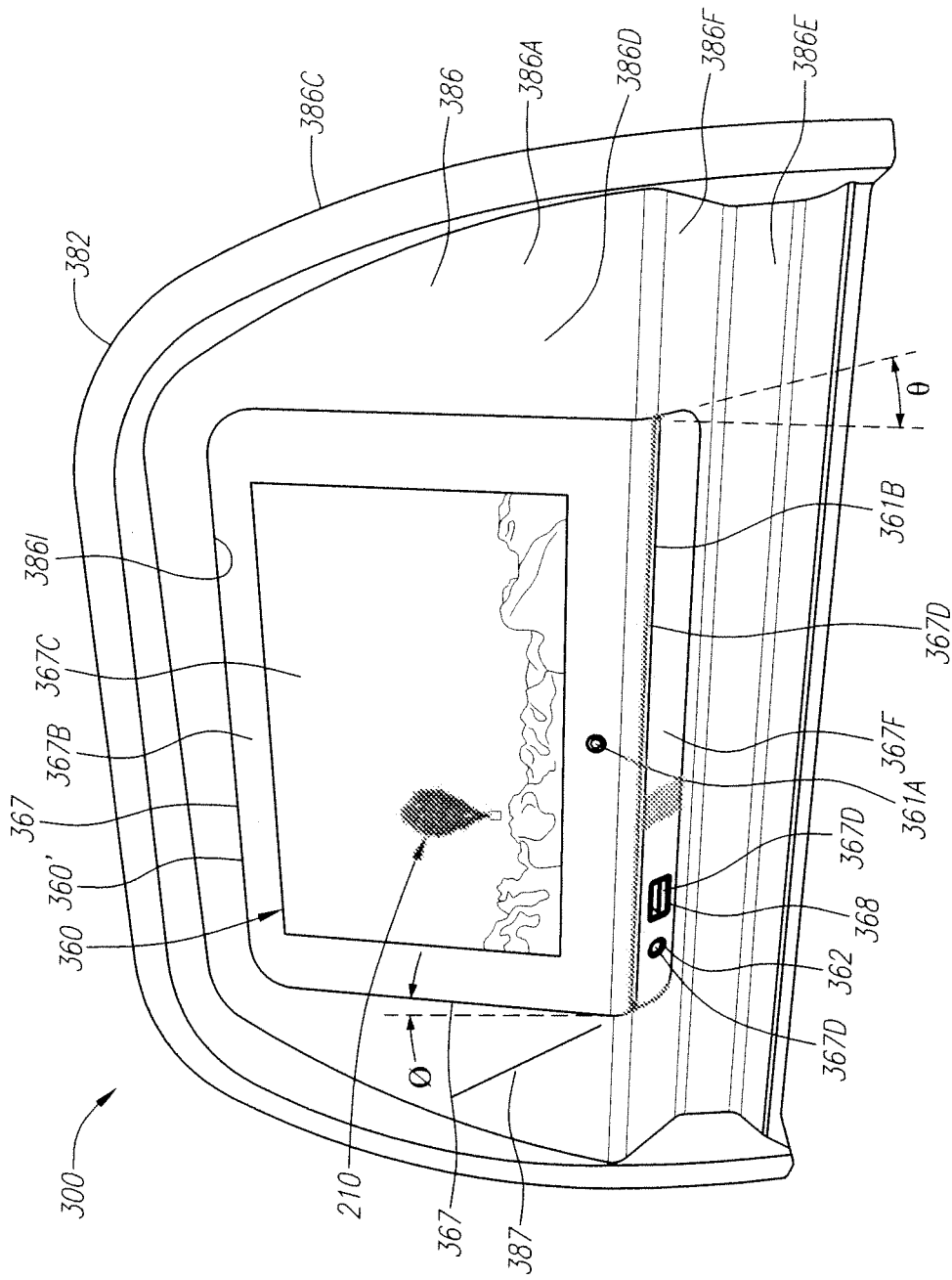
FIG. 4A is an exemplary detail drawing illustrating an exterior view of an embodiment of the integrated system module of FIG. 3, wherein the integrated system module is installed at the seatback of a user seat.
Figure 4B:
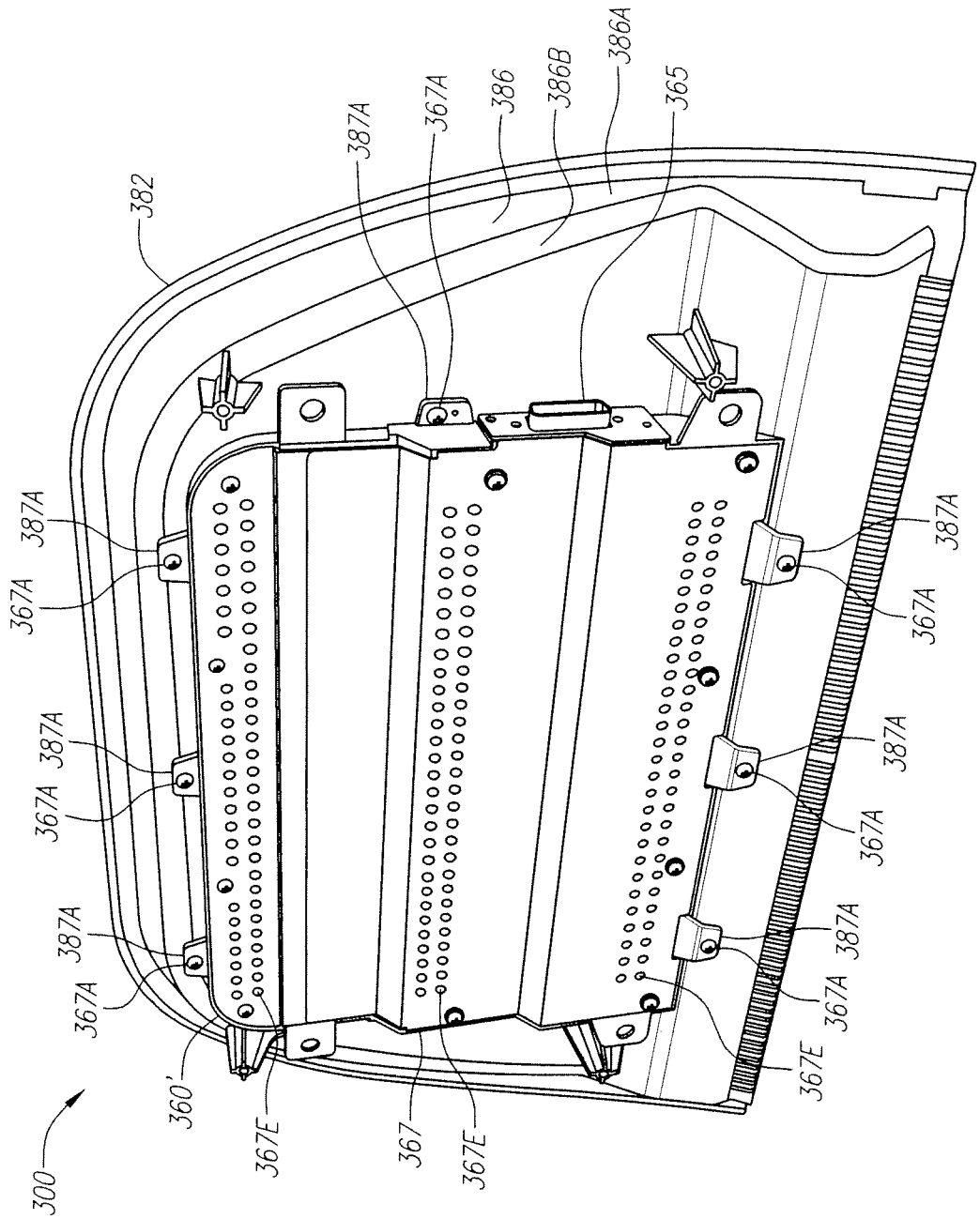
FIG. 4B is an exemplary detail drawing illustrating an interior view of the integrated system module of FIG. 4A.

FIGS. 4A-B illustrate an exemplary installation of the integrated system module 360' of FIG. 3 at a selected user seat 382. The user seat 382 includes a seatback 386 that forms a seatback envelope 385 (shown in FIG. 5) for receiving the integrated system module 360'. The integrated system module 360' is illustrated in FIG. 4A as being disposed within an expansive facade (or shroud) 386A. Stated somewhat differently, the shroud 386A can form a module opening 386I for at least partially receiving the module housing 367 of the integrated system module 360'. In order to accommodate a thin-profile video interface system 362, the shroud 386A likewise can be provided with a thin profile to minimize intrusion into the user area. The shroud 386A preferably is formed with a concave shape (or contour) as shown in FIG. 4A. The concave shroud 386A can have a thickness that is minimized at a central region of the seatback 386 and that increases toward the peripheral regions of the seatback 386, which are adjacent to a seat frame (not shown) of the seatback 386. The shroud 386A advantageously reduces an overall thickness T (shown in FIGS. 7B-C) of the seatback 386, providing more room for users 900 (shown in FIG. 8A) and increasing overall comfort. A seat trim 386C highlights the thin composite structure of the user seat 382.

The shroud 386A preferably surrounds the integrated system module 360' and provides predefined buffer zones around the selected system components 361 for communication cable assemblies 369 (shown in FIGS. 7A-C) and/or the hands 910 (shown in FIG. 8A) of the user 900 (shown in FIG. 8A). Each selected system component 361 can be associated with a unique buffer zone, and/or groups of the selected system components 361 can share a common buffer zone. The buffer zones help to prevent the communication cable assemblies 369 and/or hands 910 from inadvertently interfering with operation of the integrated system module 360'. The shroud 386A preferably provides ample buffer zones around the selected system components 361, such as the audio interface system 364, the access point 368, and/or the card reader system 361B, for accommodating the hands 910 of the user 900.

As desired, definition (and/or activation) of the buffer zones can be static and/or dynamic over time. While a card (not shown) is being swiped by the card reader system 361B, for example, one or more zones adjacent to the card reader system 361B can be at least temporarily activated to inhibit inadvertent interference from one or both of the user's hands 910 that are holding the card. In one embodiment, at least one of the selected system components 361 can be associated with a buffer zone that prevents interference from a user 900 in a standing position, a seated position, or both. By providing a flush mounting between the face panel 367B of the integrated system module 360' and the shroud 386A, the hands 910 of the user 900 are less likely to catch on the part lines between the face panel 367B and the shroud 386A.

The shroud 386A can be provided with a color scheme of one or more colors that matches a color (and/or tint) of the face panel 367B of the module housing 367 to ensure that the viewing content 210 dominates the user's viewing experience while extending the entertainment experience beyond the video interface system 362. In one embodiment, the color of the shroud 386A and the face panel 367B comprises a dark color, such as black and/or dark blue. A color scheme of the face panel 367B and the shroud 386A preferably are compatible (or consistent) with a color scheme of the seatback 386, forming a seamless transition between the face panel 367B and the shroud 386A. Through placement of the integrated system module 360' within the seatback 386, sculpting (or shaping) of the shroud 386A, and application of color, the perceived screen area of the video interface system 362 can be maximized, and the user interface system 360 can appear to be an integrated part of the seatback 386. The user interface area thereby can be made as large and/or prominent as possible.

In one embodiment, the entertainment experience can be extended beyond the physical borders of the integrated system module 360'. The perceived screen area of the video interface system 362, for example, can be maximized through placement, shroud sculpting, carrying color from the video interface system 362 to the larger area of the shroud 386A, extended surfaces tangent to the face panel 367B (and/or the transparent panel region 367C) of the module housing 367, extended regions color-matched to the glass area of the video interface system 362, and/or application of color. By integrating the user interface system 360 into the user seat 382, users can be provided with an immersive entertainment experience during travel, wherein the users are surrounded with viewing content and other services. The vehicle information system 300 thereby can create an expansive entertainment experience for the users during travel, providing a perception that the entertainment experience follows entertainment devices in their homes. Advantageously, the system components are provided as integrated components of the user seat 382, rather than as separate, added-on components.

When disposed within the user seat 382, the integrated system module 360' and the shroud 386A can present a symmetrical, uncluttered visual area that preferably is free of distractions and unnecessary elements. Parting lines and additive elements such as handsets, hangers, placards, buttons, and labels, for example, can be minimized. Asymmetrical treatments (and/or one-sided encroachments) within the visual area preferably are avoided. Similarly, any necessary openings, including any ventilation gaps 367G (shown in FIG. 6), preferably are combined discretely with existing part lines, hidden from user view, or otherwise dealt with discretely.

As illustrated in FIG. 4A, the size, shape, dimension, and/or profile of the module housing 367 of the integrated system module 360' compliments the shroud 386A of the user seat 382. More particularly, when the integrated system module 360' is properly installed at the user seat 382, the face panel 367B is flush with (and/or conforms to the contour of) the shroud 386A, reducing a thickness of the integrated system module 360'. Passenger space and comfort between adjacent passenger seats 382 thereby can be increased without adjusting a seat pitch between the adjacent passenger seats 382. Alternatively, or additionally, the seat pitch between the adjacent passenger seats 382 can be decreased to increase a total number of passenger seats 382 installed aboard the passenger vehicle 390.

The precision and thinness of the integrated components preferably permits the depth of the seatback 386 to be minimized, while permitting the video interface system 362 to be positioned within the passenger seat 282 at a predetermined viewing (or tilt) angle $\phi$. As desired, the integrated system module 360' can support providing the video interface system 362 with a negative (or back from vertical) monitor tilt for passenger comfort and to facilitate viewing of the viewing content 210. The integrated system module 360', in other words, can be installed at the user seat 382 such that the video interface system 362 is tilted back into the seat profile at the predetermined tilt angle $\phi$, enabling an optimal viewing experience. The tilt angle $\phi$ can comprise any suitable tilt angle and preferably comprises a tilt angle within a tilt angle range between one degree (1°) back of vertical and thirty degrees (30°) back of vertical, including a tilt angle $\phi$ of five degrees (5°) back from vertical.

The predetermined tilt angle $\phi$ preferably comprises a fixed tilt angle but, as desired, can be provided as an adjustable tilt angle, for example, for compensating for variations in user height and/or reclining angle of the seatback 386. In one embodiment, the video interface system 362 provides a wide (or ultra-wide) viewing angle for facilitating an excellent viewing experience even if the tilt angle $\phi$ of the video interface system 362 is fixed. The wide viewing angle can range from eight-nine degrees (89°) in each horizontal and/or vertical direction and preferably comprises a minimum viewing angle of at least one hundred, seventy degrees (170°). Use of a fixed tilt angle $\phi$ advantageously enables heavy hardware (not shown), such as a tilt mechanism, brackets, and other hardware, to be eliminated from the integrated system module 360'.

In one embodiment, the predetermined tilt angle $\phi$ can be set at a pre-tilt (or default tilt) angle that is selected based upon one or more applications and/or conditions. In other words, the predetermined tilt angle $\phi$ can be a pre-tilt (or default tilt) angle that is optimized for the one or more applications and/or conditions. In one preferred embodiment, the predetermined tilt angle $\phi$ of the video interface system 362 is optimized to compensate for seat recline and/or seat pitch of the user seat 382.

The flush (or tangential) mounting of the integrated system module 360' advantageously creates a smooth, seamless transition when reaching an edge of the face panel 367B. In other words, the transparent panel region 367C of the module housing 367 preferably is visually continued into the surrounding shroud 386A, supporting visual continuity of the perceived entertainment surface. The smooth transition is facilitated by mounting the module housing 367 directly to the shroud 386A as shown in FIG. 4B. Turning briefly to FIG. 4B, one exemplary manner for installing the integrated system module 360' at the user seat 382 is illustrated. A back surface 386B of the shroud 386A is shown as including a plurality of shroud mounting regions 387A for fine-tuning the flush mounting of the integrated system module 360' onto the shroud 386A. In the manner set forth above with reference to FIG. 3, the shroud mounting regions 387A are configured to cooperate with the plurality of module mounting regions 367A of the module housing 367. The integrated system module 360' thereby can be flush mounted to the shroud 386A via the shroud mounting regions 387A.

The module mounting regions 367A and the shroud mounting regions 387A can cooperate in any conventional manner. Whereas illustrated as being coupled via a plurality of fasteners, the module mounting regions 367A and the shroud mounting regions 387A can be coupled via one or more sets of cooperating detents, as desired. Illustrative types of detents are described above. If the module mounting regions 367A and the shroud mounting regions 387A are coupled via a plurality of fasteners, such as screws, for example, the shroud mounting regions 387A can comprise channels, such as threaded inserts, for receiving (and/or engaging) the fasteners. The shroud mounting regions 387A can be formed (or molded) within the shroud 386A and/or can be coupled with the shroud 386A.

The module housing 367 likewise is shown as including a plurality of ventilation holes 367E for managing (and/or dissipating) heat generated by, or otherwise providing cooling for, the selected system components 361 of the integrated system module 360'. As shown in FIG. 4B, the ventilation holes 367E are disposed on a portion of the module housing 367 that is disposed within the envelope 385 (shown in FIG. 5) of the user seat 382. The ventilation holes 367E thereby are hidden from view and do not present an unnecessary visual distraction. By disposing the module housing 367 within the seatback envelope 385 of the user seat 382, the vehicle information system 300 can achieve a lower profile (greater passenger space), lower total system weight, and reduced install/maintenance costs. External connections thereby can be minimized to reduce wiring harness requirements and associated overall system weight.

Advantageously, electrical connections (not shown) associated with the integrated system module 360' can be limited to facilitate installation, removal, and/or maintenance. Exemplary electrical connections can include an electrical power input connection and/or a network communication connection. The electrical power input connection can be configured to receive alternating current (AC) power and/or direct current (DC) power; whereas, the network communication connection can support data communications with any conventional communication protocol, such as an Ethernet protocol.

As desired, the power and data connections can be combined to further reduce connection complexity. Exemplary communication protocols for combining power and data connections include a Power over Ethernet (PoE) protocol. The integrated system module 360' likewise is shown as including a communication connector 365 for coupling the integrated system module 360' with the remainder of the vehicle information system 300. Thereby, the integrated system module 360' can receive power from, and exchange data with, the vehicle information system 300. The integrated system module 360' preferably includes a single communication connector 365 for coupling with the remainder of the vehicle information system 300 to facilitate installation, removal, and/or maintenance of the integrated system module 360'. In the manner set forth above, the electrical interconnections (not shown) among the selected system components 361 (shown in FIG. 2) thereby can be internal to the integrated system module 360'.

Returning to FIG. 4A, the shroud 386A of the seatback 386 is shown having a central region 386D with a contour that is generally planar. Stated somewhat differently, the shroud 386A includes a generally planar portion 386D. The module opening 386I can be formed within the central region 386D and/or an angled shroud portion 386F of the shroud 386A. When the module housing 367 of the integrated system module 360' is disposed within the module opening 386I, the central region 386D of the shroud 386A preferably is coplanar with the transparent panel region 367C of the module housing 367 as illustrated in FIG. 4A. FIG. 4A likewise shows that the shroud 386A can form a channel (or pocket) 386E adjacent to the central region 386D of the shroud 386A. In other words, the contour of the shroud 386A can define a channel (or pocket) 386E.

The channel 386E is at least partially defined by the angled shroud portion 386F of the shroud 386A, wherein the angled shroud portion 386F forms a predetermined channel angle Ø with the central region 386D. The channel angle Ø and the panel angle α (shown in FIG. 3) preferably are equal. The angled shroud portion 386F of the shroud 386A preferably is coplanar with a port panel region 367F of the module housing 367 of the integrated system module 360'. The port panel region 367F comprises a portion of the module housing 367 that forms the apertures 367D for the ports (or connectors) associated with the audio interface system 364 and/or the access point 368 and preferably is integrated with as shown in FIG. 4A, but may be separate from, the face panel 367B of the module housing 367.

The channel angle Ø and/or size (and/or shape and/or dimension) of the channel 386E is selected to inhibit physical interference that can result from use of the selected system components 361 of the integrated system module 360'. For example, the channel 386E should be provided with sufficient dimensions for accommodating conventional peripheral devices (and/or peripheral device cable assemblies, including any cable strain reliefs). The channel 386E preferably ensures sufficient space is provided in order to inhibit interference among peripheral devices when each of the system components 361 (and/or the associated system component functions) is being utilized by the user 900. In one embodiment, the channel angle Ø and/or the channel 386E advantageously inhibits inadvertent activation of the touchscreen video interface system 362 and/or the touch point 361A, for example, when another selected system component 361 (and/or the associated system component function), such as the audio interface system 364, the access point 368, and/or the card reader system 361B, is being accessed or otherwise utilized.

If a personal media device 200 (shown in FIGS. 7A-C) is coupled with the access point 368, the channel 386E and/or the channel angle Ø enable the module communication connector 369A (shown in FIGS. 7A-C) to couple with a selected communication port of the access point 368 in a manner such that the communication cable assembly 369 (shown in FIGS. 7A-C) does not interfere with presentation of viewing content 210 via the video interface system 362. The channel 386E and/or the channel angle Ø likewise inhibit interference between the communication cable assembly 369 (and/or the personal media device 200) and other seat components, such as a tray table 383A, a tray table latch 383B, and/or a magazine pocket 383C (collectively shown in FIGS. 7A-C), of the user seat 382. In a similar manner, the channel 386E and/or the channel angle Ø can inhibit interference that can result from an external audio device being coupled with a selected audio port of the audio interface system 364.

The card reader system 361B is shown as being advantageously disposed adjacent to a junction (and/or intersection) between the transparent panel region 367C and the port panel region 367F of the module housing 367. As illustrated in FIG. 4A, the third aperture 367D preferably is formed in the port panel region 367F near the junction. Thereby, when a card (not shown) is to be swiped by the card reader system 361B, the card can be received by the card slot opening of the card reader system 361B and extend away from the integrated system module 360', avoiding interference with the viewing content 210 being presented via the video interface system 362. In one embodiment, the channel 386E is provided with a suitable size, shape, and/or dimension such that the channel 386E can accommodate a hand 910 (shown in FIG. 8A) of the user 900 (shown in FIG. 8A) to facilitate swiping the card.

Figure 5:
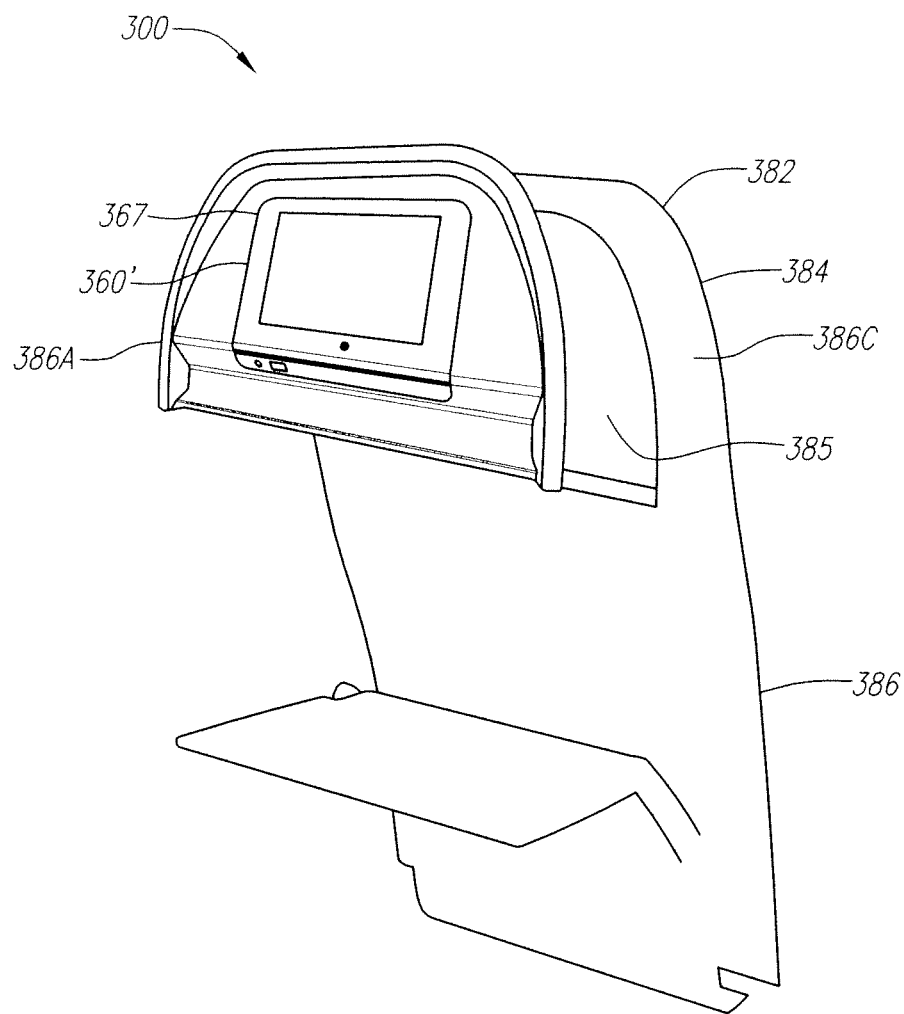
FIG. 5 is an exemplary detail drawing illustrating an alternate embodiment of the integrated system module of FIG. 3, wherein the integrated system module is coupled with a shroud prior to installation at the seatback of the user seat.

Turning to FIG. 5, the integrated system module 360' is shown as being disposed in the module housing 367 and coupled with the shroud 386A prior to installation at the user seat 382. The integrated system module 360' and the shroud 386A thereby can be installed, removed, upgraded, and/or maintained as a composite unit at the user seat 382. The seatback 386, the seat trim 386C and/or a frame of the user seat 382 can form a seatback envelope 385 for receiving the module housing 367 and/or the shroud 386A. Although shown in FIG. 5 as being formed adjacent to a headrest 384 of the user seat 382 for purposes of illustration only, the seatback envelope 385 can be formed at any suitable location within the seatback 386 as desired. Preferably, the module housing 367 and/or the shroud 386A is readily installed at the seatback envelope 385 with conventional (and/or basic) fasteners that require a minimum number of steps to engaged and/or disengage the seatback 386 and/or the frame of the user seat 382 in a quick and efficient manner. Installation of the integrated system module 360' within the seatback 386 thereby is facilitated.

Alternatively, the integrated system module 360' can be provided without a module housing 367. The integrated system module 360' thereby can comprise the selected system components 361 (shown in FIG. 2) that be mounted directly to seatback 386 and/or the frame of the user seat 382. The seatback 386 and/or the frame of the user seat 382 thereby can form a protective mechanical enclosure, in whole and/or in part, for the selected system components 361 of the integrated system module 360'. Advantageously, the seatback mechanical components can be used as part of the electronics enclosure, reducing a need for separate mechanical/electrical enclosure/shielding components.

The seatback 386 and/or the frame of the user seat 382 likewise can provide a thermal/heat sink function and/or electronic shielding, e.g. electromagnetic interference (EMI) containment, for the integrated system module 360'. In other words, the integrated system module 360' and the user seat 382 can share one or more mechanical components, thermal protection and/or electromagnetic interference (EMI) protection. As desired, the selected system components 361 of the integrated system module 360' can be contained within the envelope 385 of the seat frame such that the video interface system 362 does not protrude from the seatback 386 of the user seat 382. The video interface system 362 thereby can appear to be integrated with the user seat 382.

Although shown and described herein as being suitable for being disposed within a seatback envelope 385 provided adjacent to a headrest 384 of a user seat 382 for purposes of illustration only, the integrated system module 360' can be disposed at any suitable location within a user seat 382 and/or within the operating environment. The integrated system module 360', for example, can be installed at an armrest 388 (shown in FIGS. 12A-B) of the user seat 382 and/or at a region of the seatback 386 distal from the headrest 384. Alternatively, and/or additionally, the integrated system module 360' can be installed at any suitable location within the operating environment, such as a wall 396 (shown in FIGS. 12A-B), a ceiling, a floor, and/or a bulkhead adjacent to the user seat 382.

Figure 6:
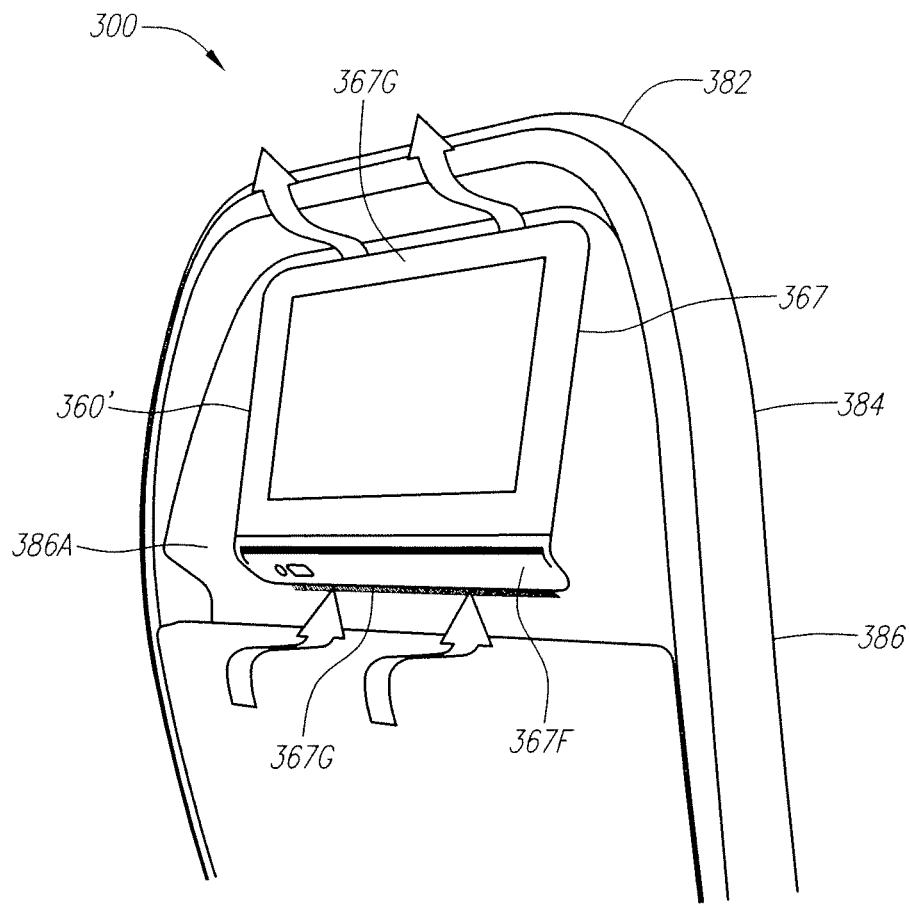
FIG. 6 is an exemplary detail drawing illustrating another alternative embodiment of the integrated system module of FIG. 3, wherein the integrated system module and the shroud form at least one gap for providing ventilation for the integrated system module.

FIG. 6 illustrates an exemplary manner by which the integrated system module 360' and the shroud 386A can discretely provide active and/or passive ventilation for the selected system components 361 of the integrated system module 360'. The module housing 367 and/or the shroud 386A can be configured to form one or more ventilation gaps 367G between the module housing 367 and the shroud 386A. Stated somewhat differently, the existing part lines between the module housing 367 and the shroud 386A can be utilized to provide the ventilation gaps 367G. As shown in FIG. 6, for example, the shroud 386A adjacent to the port panel region 367F of the module housing 367 can be recessed to form a selected ventilation gap 367G. The selected ventilation gap 367G likewise can be formed by reducing at least one relevant dimension of the port panel region 367F. As desired, a second ventilation gap (not shown) can be formed by recessing the shroud 386A adjacent to a distal panel region 367G of the module housing 367. By taking advantage of existing part lines between the module housing 367 and the shroud 386A, the ventilation gaps 367G preferably are hidden from user view and otherwise dealt with discretely.

Figure 7A:
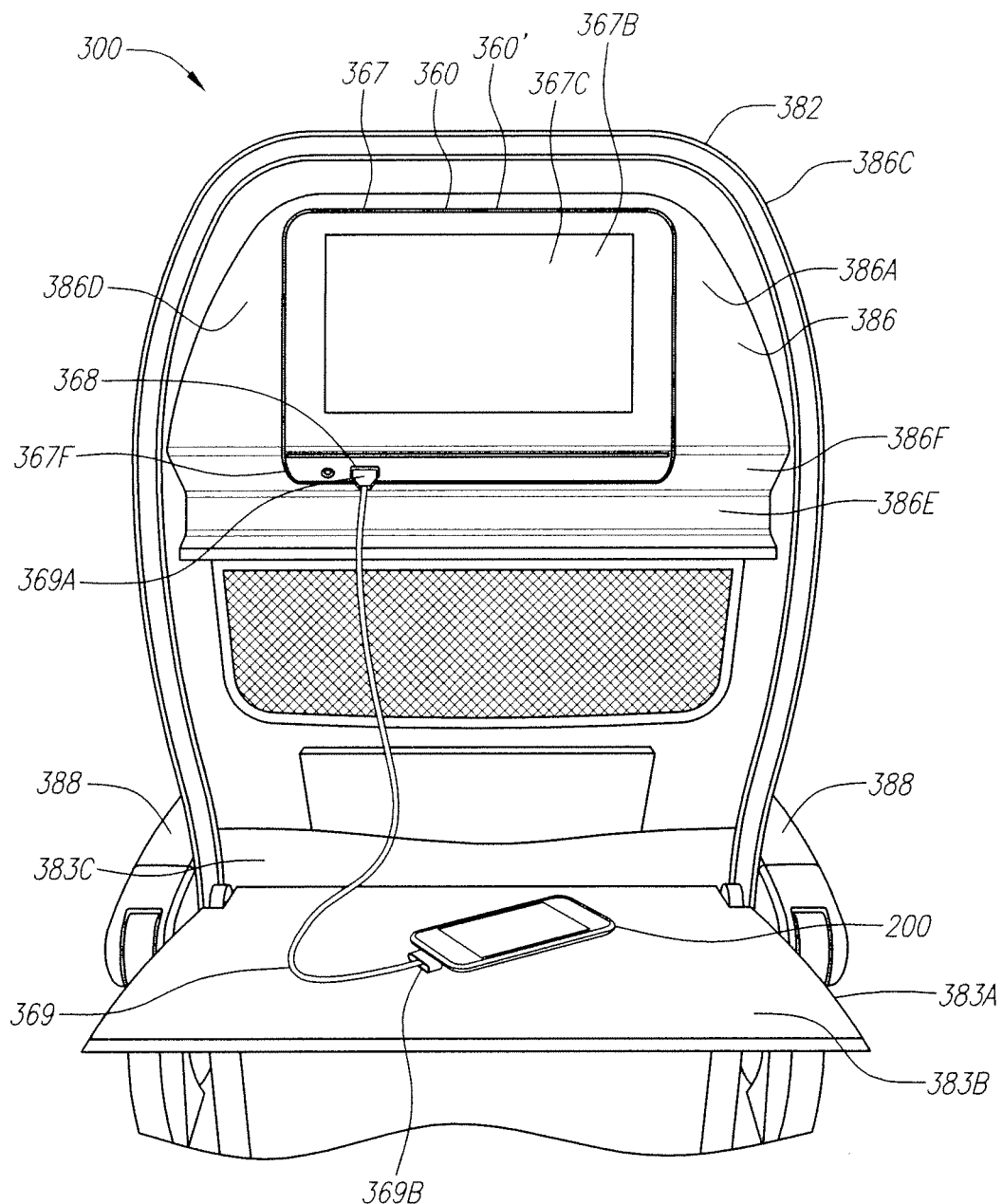
FIGS. 7A-C are exemplary detail drawings illustrating an embodiment of a user seat, wherein the integrated system module of FIGS. 4A-B is installed at a seatback of the user seat.
Figure 7B:
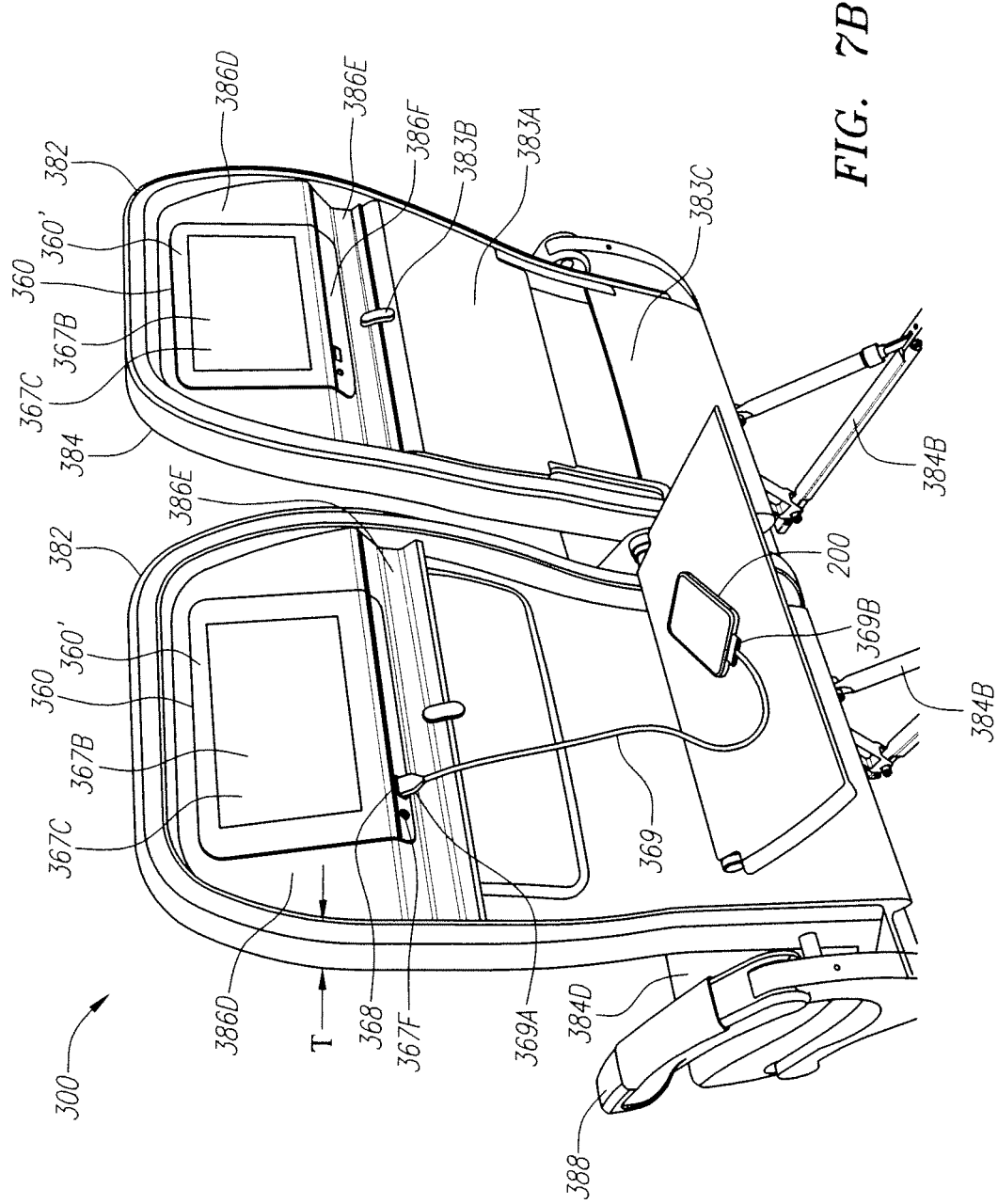
Figure 7C:
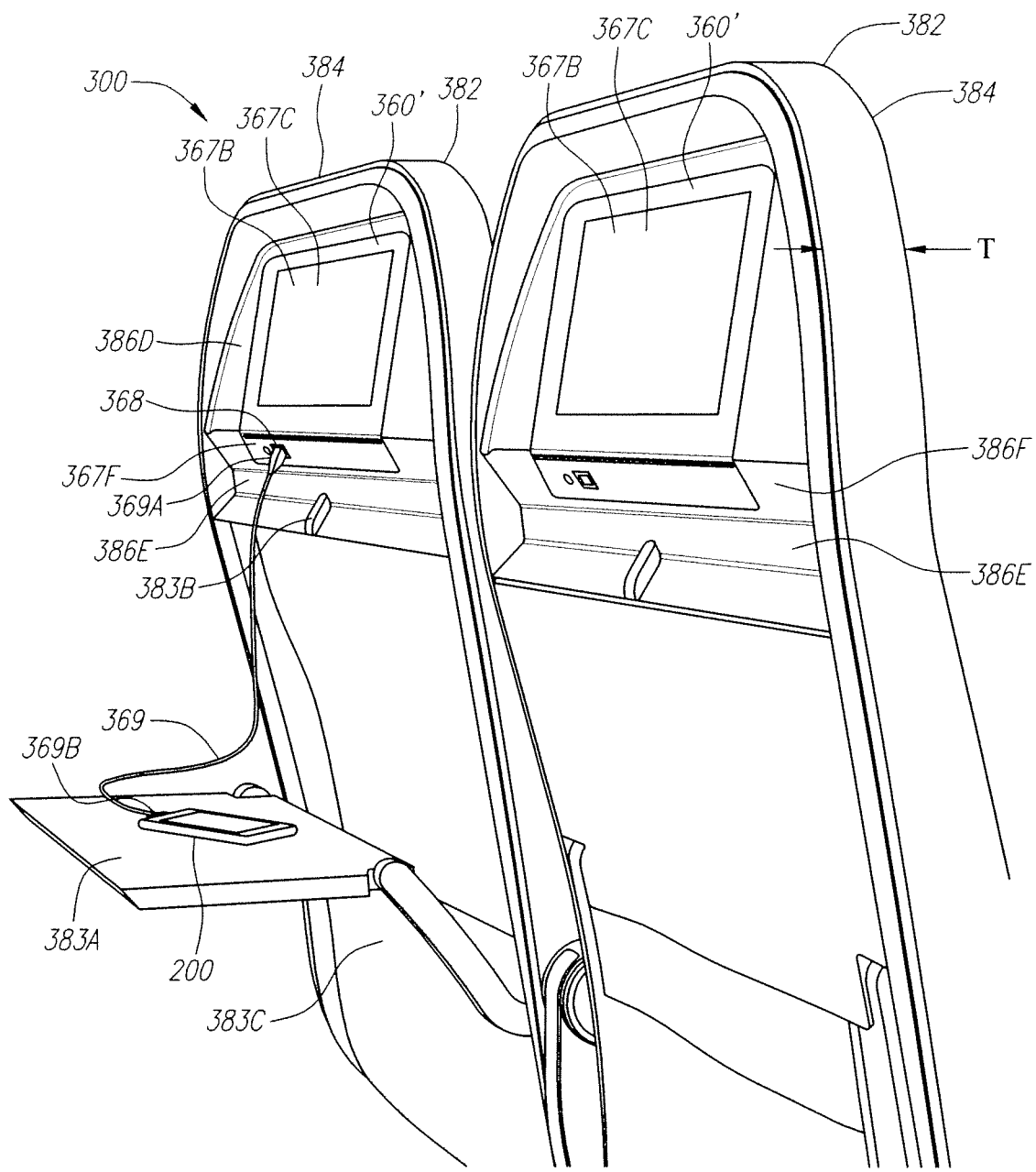

Turning to FIGS. 7A-C, exemplary user (or passenger) seats 382 are illustrated, wherein an integrated system module 360' has been installed at the respective seatbacks 386 of the user seats 382 in the manner set forth in more detail above. Each of the integrated system modules 360' of FIGS. 7A-C is shown as being provided, and as being disposed within shrouds 386A, in the manner shown and described with reference to FIGS. 4A-B. The face panel 367B of each integrated system module 360' can be mounted flush with the associated shroud 386A and can include a transparent panel region 367C adjacent to the video interface system 362 of the integrated system module 360' and a port panel region 367F adjacent to at least one communication port (or connector) of the integrated system module 360'. In the manner set forth in more detail above with reference to FIG. 4A, exemplary communication ports of the integrated system module 360' can include communication ports associated with the audio interface system 364, the user input system 366, the access point 368, and/or any other suitable type of selected system component 361 (and/or selected function associated with the selected system component 361), without limitation. The integrated system modules 360' thereby provide user interface systems 360 for the user seats 382 as discussed above.

In addition to the seatbacks 386, the user seats 382 likewise can include one or more other conventional seat components. FIG. 7B shows that the user seats 382 each can include a seat cushion 384D and at least one armrest 388, each resting upon a seat base 384B. The seat base 384B preferably provides user storage space. As shown in FIGS. 7A-C, the user seats 382 likewise can include a tray table 383A and/or a magazine pocket 383C. The tray table 383A can be secured to the seatback 386 via a tray table latch 383B.

In one embodiment, at least one of the seat components can be selectively rotated relative to the seat base 384B. A selected user seat 382, for example, can include a conventional reclining seatback 386 and/or an armrest 388 that rotates into an upright position. As desired, the user seats 382, such as user seats 382 associated with a selected (or premium) user class, can include one or more premium seat components. Exemplary premium seat components can include an in-seat massage system (not shown) and/or at least one actuator system (not shown) for electrically (or electronically) adjusting a positioning of the user seats 382. The seat components of the user seats 382 as shown and described herein are not exhaustive and are provided herein for purposes of illustration only and not for purposes of limitation.

Each user seat 382 can be provided individually as shown in FIG. 7A and/or can be grouped with one or more other user seats 382 as illustrated in FIGS. 7B-C. Stated somewhat differently, the user seats 382 can be provided in seat groups that can comprise one or more user seats 382. When provided in a seat group that includes more than one user seat, selected seat components can be shared among adjacent user seats 382. For example, the adjacent user seats 382 can share a common armrest 388 and/or a common seat base 384B.

The thin profile of the video interface system 362 and, therefore, the module housing 367 of the integrated system module 360' advantageously enables a thickness T of the seatback 386 and/or an overall size (and/or shape and/or dimension) of the user seat 382 to be minimized. In other words, use of the integrated system module 360' enables the seatback 386 of the user seat 382 to be thinner than seatbacks of conventional user (or passenger) seats that provide user interface systems. Accordingly, use of the integrated system module 360' at the user seat 382 enables an operating environment to provide greater user space and comfort at a selected seat pitch. A weight of the user seat 382 likewise can be reduced.

In one embodiment, other seat features can contribute to the reduction in the thickness T of the seatback 386 and/or the overall size of the user seat 382. The shroud 386A, for example, advantageously can reduce the thickness T of the seatback 386. As illustrated in FIGS. 7A-C, the shroud 386A can be formed with a concave shape (or contour). The concave shroud 386A enables the integrated system module 360' to be recessed within the seatback 386 such that the module housing 367 does not extend beyond the seat trim 386C of the user seat 382, further enhancing user comfort.

Additionally, and/or alternatively, one or more selected seat components likewise can contribute to the reduction in the thickness T of the seatback 386 and/or the overall size of the user seat 382 and, thereby, increase passenger comfort. FIG. 7A, for example, shows that the armrests 388, the tray table 383A, and/or the magazine pocket 383C can be disposed at least partially inside the user seat 382. By disposing the selected seat components inside the user seat 382, the seatback 386 (and/or the user seat 382) can have a thinner appearance without adding any depth.

In the manner set forth above with reference to FIG. 4A, the shroud 386A of the seatback 386 can form a contour that, with the module housing 367 of the integrated system module 360', defines a channel 386E. The angled shroud portion 386F of the shroud 386A (and/or the port panel region 367F of the module housing 367) can form the predetermined channel angle Ø (shown in FIG. 4A) with the central region 386D of the shroud 386A (and/or the face panel 367B of the module housing 367). The channel angle Ø, the size (and/or shape and/or dimension) of the channel 386E, and/or the spacing among the communication ports of the integrated system module 360' is selected to inhibit physical interference that can result from use of the selected system components 361 (and/or the associated system component functions) of the integrated system module 360'. Each communication port of the integrated system module 360' thereby can be utilized without interference among the integrated system module 360', the shroud 386A, the seat components, and any peripheral devices coupled with the communication ports.

As shown in FIGS. 7A-C, for example, a personal media device 200 can be coupled with a selected access point 368 of the integrated system module 360'. The channel 386E and/or the channel angle Ø enable the module communication connector 369A to couple with the access point 368 in a manner such that the communication cable assembly 369 does not interfere with presentation of viewing content 210 via the video interface system 362. The channel 386E and/or the channel angle Ø likewise inhibit interference between the personal media device 200 (and/or the communication cable assembly 369, including the module communication connector 369A and/or any strain relief) and any seat components, such as the tray table 383A, the tray table latch 383B, and/or the magazine pocket 383C of the user seat 382. The personal media device 200 (and/or the communication cable assembly 369), for example, preferably does not interfere with the tray table 383A regardless of whether the tray table 383A is in a stowed position, an unlatched position, a deployed position, and/or transitioning between two of the positions. Additionally, and/or alternatively, the personal media device 200 is inhibited from interfering with another peripheral device coupled with another communication port of the integrated system module 360'.

An alternative embodiment of the integrated system module 360' is illustrated in FIG. 8A. Turning to FIG. 8A, the integrated system module 360' is shown as including a video interface system 362, wherein the viewable area 362D (shown in FIG. 3) of the video interface system 362 is separated (or divided) into a plurality of viewing regions (or frames) 362H. In other words, a portion of the viewable area 362D designated for presenting viewing content 210 comprises less than the full viewable area 362D of the video interface system 362. The percentage of the viewable area 362D designated for presenting viewing content 210 can comprise any suitable percentage and, for example, can range from forty percent (40%) to eighty percent (80%) or more of the viewable area 362D. In one embodiment, the viewable area 362D designated for presenting viewing content 210 comprises a majority of the viewable area 362D.

As desired, one or more viewing regions 362H can be designated for presenting other viewing content 210, such as in a picture-in-picture (PiP) format and/or a picture-outside-picture (PoP) format in the manner set forth in the co-pending United States patent application, entitled "SYSTEM AND METHOD FOR PRESENTING HIGH-QUALITY VIDEO," Ser. No. 11/379,360, filed on Apr. 19, 2006, the disclosure of which is hereby incorporated herein by reference in its entirety. Alternatively, and/or additionally, at least one selected viewing region 362H can be associated with the user input system 366. The video interface system 362 thereby can present secondary control indicia 362I for controlling an operation of the integrated system module 360' and/or the vehicle information system 300. The secondary control indicia 362I can be presented within the selected viewing region 362H and can be activated in the manner discussed above with reference to the touch point 361A (shown in FIG. 4A) and/or other control button.

The secondary control indicia 362I can be actuated for selecting the viewing content 210 to be presented by the video interface system 362 and/or for controlling the presentation of the selected viewing content 210. The secondary control indicia 362I, for example, can include controls for selecting an instant messaging (and/or electronic mail (or email)) function (or content) with other users (aboard the passenger vehicle 390 (shown in FIGS. 10A-B) and/or external from the passenger vehicle 390), movie content, television content, music content, gaming content, Internet content, mapping (and/or travel) information content, destination content, current geographic location content, arrival time content, current time/date content, advertising content, and other types of content available via the vehicle information system 300. Conventional secondary control indicia 362I for controlling the presentation of the selected viewing content can include a play control, a stop control, a pause control, a rewind control, and/or a fast-forward control, without limitation. Additional control indicia 362I can include slow-motion (and/or fast-motion) playback.

Figure 8B:
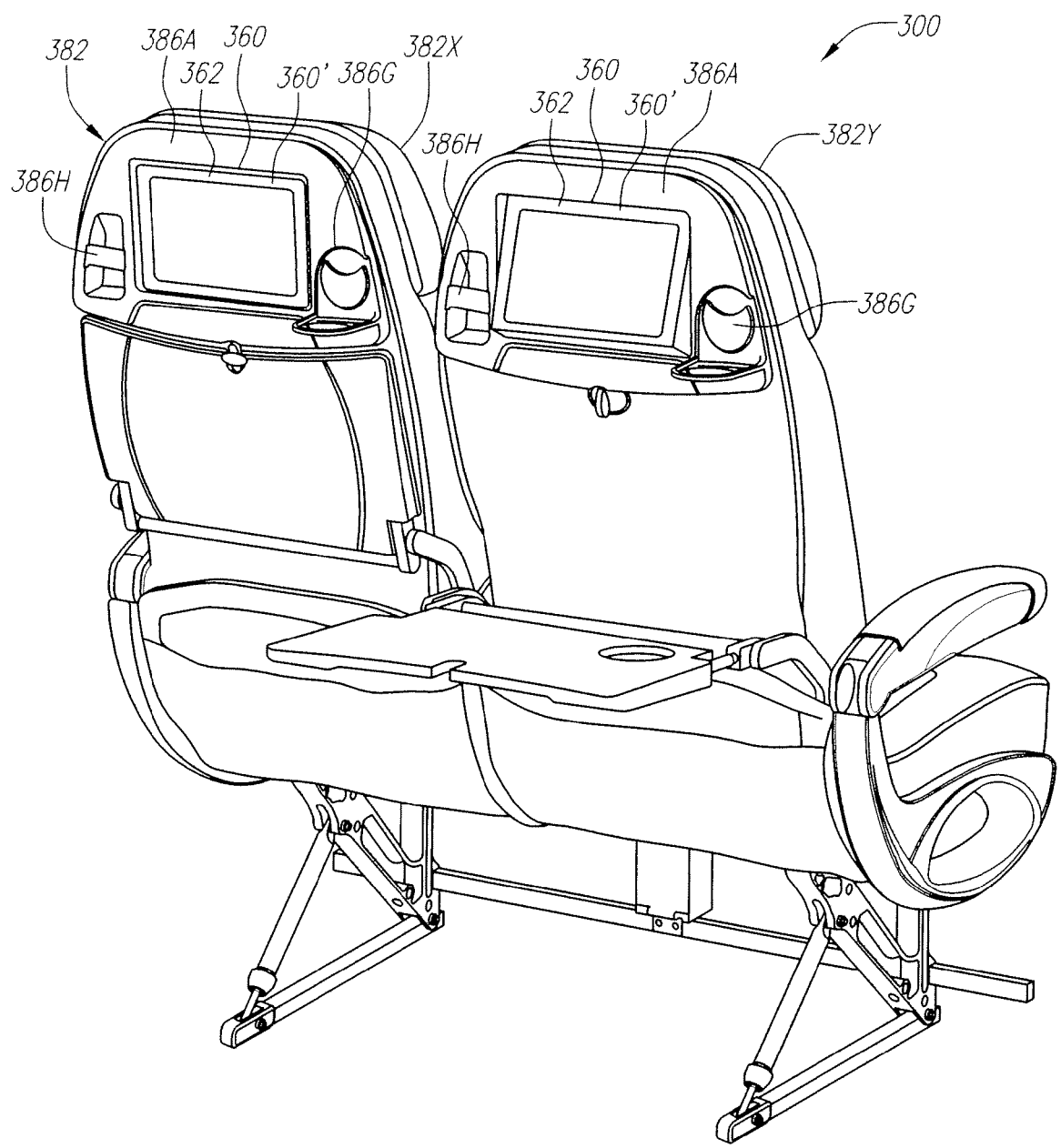
FIG. 8B is an exemplary detail drawing illustrating another alternative embodiment of the integrated system module of FIG. 2, wherein the integrated system module supports an adjustable viewing angle for a video interface system of the integrated system module.

Turning to FIG. 8B, the integrated system module 360' is shown as including a video interface system 362 with an adjustable viewing (or tilt) angle φ (shown in FIG. 4A). The user seat 382X illustrates the video interface system 362 as being in the pre-tilt (or default tilt) angle; whereas, the user seat 382Y shows the video interface system 362 as being adjusted to a tilt angle φ that differs from the pre-tilt angle. In the manner set forth above with reference to FIG. 4A, the video interface system 362 preferably provides a wide viewing angle for facilitating an excellent viewing experience regardless of the tilt angle φ.

The shroud 386A can include (and/or form) one or more shroud elements, as desired. FIG. 8B shows the shroud 386A as including a cup holder 386G. The cup holder 386G can be provided in any conventional manner and preferably retracts within the shroud 386A when not in use (or when in a stowed position). An exemplary cup holder 386G is illustrated in FIG. 8B. As shown in FIG. 8B, the stowed position of the cup holder 386G is illustrated with reference to the user seat 382X, and a deployed position of the cup holder 386G is illustrated with reference to the user seat 382Y. Alternatively, and/or additionally, the shroud 386A can include a storage region 386H for receiving a peripheral device, such as a personal media device 200 (shown in FIG. 12B), when the peripheral device is not in use.

Figure 9:
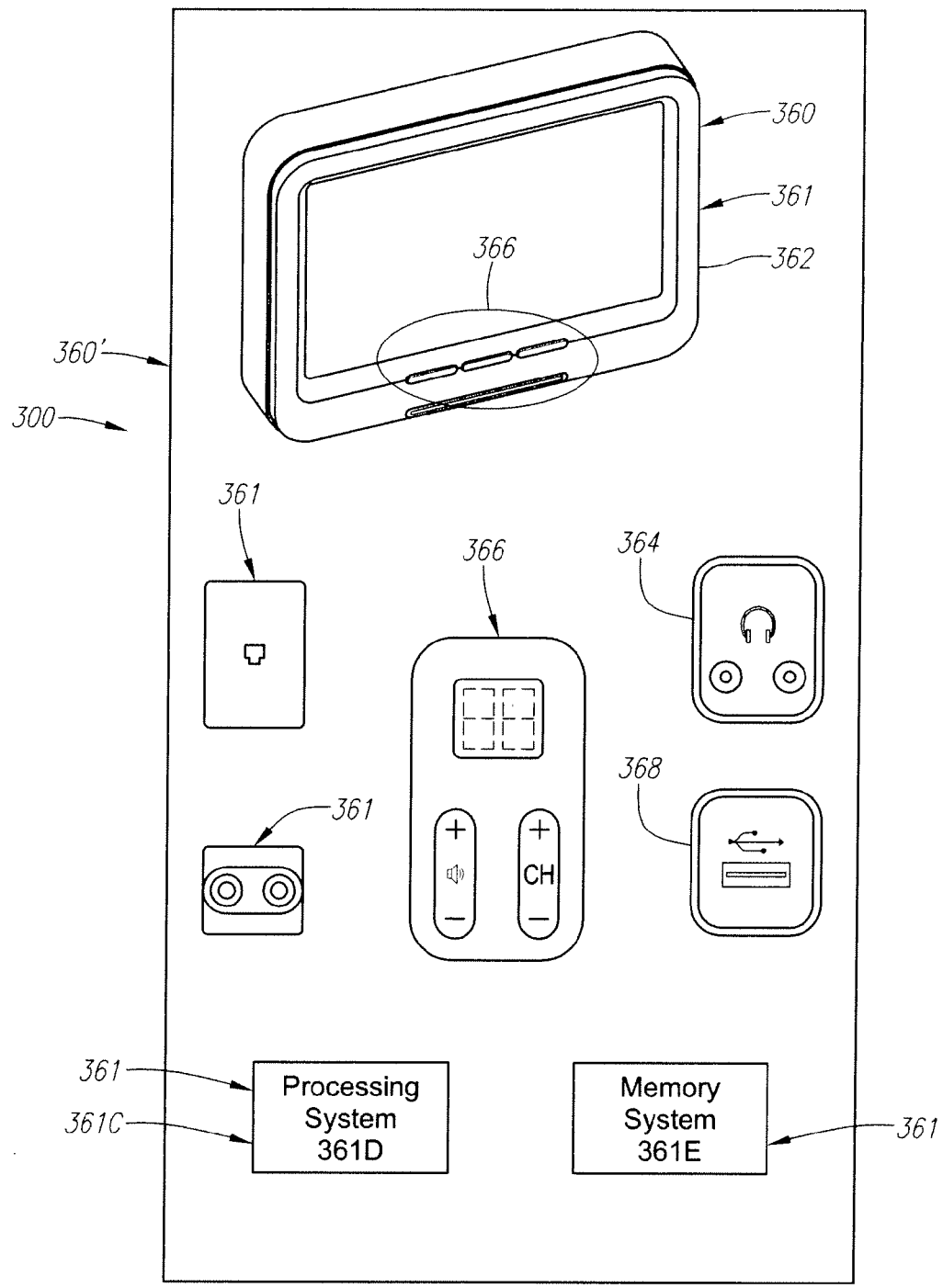
FIG. 9 is an exemplary detail drawing illustrating yet another alternative embodiment of the integrated system module of FIG. 2, wherein the integrated system module further comprises a local control system for at least partially controlling operation of the integrated system module.

Although the integrated system module 360' can be at least partially controlled via a server system 310A (shown in FIGS. 10A-B) of the vehicle information system 300, the integrated system module 360', in one embodiment, can include a local control system 361C for at least partially controlling the integrated system module 360' as illustrated in FIG. 9. The local control system 361C preferably is provided in the manner set forth above with reference to the selected system components 361 of FIG. 2. As desired, the local control system 361C can comprise one or more separate system components 361 and/or can be at least partially incorporated with at least one of the selected system components 361. In other words, if the integrated system module 360' includes a video interface system 362, an audio interface system 364, a user input system 366, and an access point 368, for example, the local control system 361C be provided as another selected system components 361 and/or can be at least partially integrated with, say, the video interface system 362.

The local control system 361C can be provided in any conventional manner and is shown in FIG. 9 as including a processing system 361D. The processing system 361D can comprise any type of processing system, such as one or more microprocessors (µPs), central processing units (CPUs), application-specific integrated circuits (ASICs), field programmable gate arrays (FPGAs), and/or digital signal processors (DSPs) of any kind. The processing system 361D can receive and process system instructions or other information provided from the vehicle information system 300 via the communication connector 365 (shown in FIG. 4B) and/or user instructions or other information provided via the user input system 366. Thereby, the processing system 361D can provide instructions to the other selected system components 361 of the integrated system module 360' and/or the vehicle information system 300.

Alternatively, and/or additionally, the local control system 361C can include a memory system 361E. The memory system 361E is configured to store and provide system information, including instruction code, such as software or firmware, intermediate calculation results, and other information associated with the processing system 361D and/or performance data related to the current and/or historical operational status of the integrated system module 360'. Preferably comprising a non-volatile memory system, the memory system 361E can comprise any suitable type of memory system, such as any electronic, magnetic, and/or optical storage media, without limitation. For example, exemplary storage media can include one or more static random access memories (SRAMs), dynamic random access memories (DRAMs), electrically-erasable programmable read-only memories (EEPROMs), FLASH memories, hard drives (HDDs), compact disks (CDs), and/or digital video disks (DVDs) of any kind.

Although the integrated system module 360' can be installed for use with a network disposed at a fixed location, such as a building, business, or school, the integrated system module 360' likewise can advantageously be applied in mobile system applications. Turning to FIGS. 10A-B, the vehicle information system 300 can be configured for installation aboard a wide variety of passenger vehicles 390. Exemplary types of passenger vehicles 390 can include an automobile 390A (shown in FIG. 10A), an aircraft 390B (shown in FIG. 10B), a bus, a recreational vehicle, a passenger boat or ferry, and/or a passenger train, or any other type of passenger vehicle without limitation. If installed on an aircraft 390B as illustrated in FIG. 10B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 10A-B, the vehicle information system 300 comprises at least one conventional content source 310 and one or more user (or passenger) interface systems 360 that communicate via a real-time content distribution system 320. Each content source 310 can be provided in the manner set forth in the co-pending United States patent applications, entitled "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; entitled "PORTABLE MEDIA DEVICE AND METHOD FOR PRESENTING VIEWING CONTENT DURING TRAVEL," Ser. No. 11/154,749, filed on Jun. 15, 2005; entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," Ser. No. 12/210,624, filed on Sep. 15, 2008; entitled "PORTABLE USER CONTROL DEVICE AND METHOD FOR VEHICLE INFORMATION SYSTEMS," Ser. No. 12/210,689, filed on Sep. 15, 2008; entitled "SYSTEM AND METHOD FOR RECEIVING BROADCAST CONTENT ON A MOBILE PLATFORM DURING TRAVEL," Ser. No. 12/237,253, filed on Sep. 24, 2008; and entitled "SYSTEM AND METHOD FOR PRESENTING ADVERTISEMENT CONTENT ON A MOBILE PLATFORM DURING TRAVEL," Ser. No. 12/245,521, filed on Oct. 3, 2008, which are assigned to the assignee of the present application and the respective disclosures of which are hereby incorporated herein by reference in their entireties.

The viewing content 210 available via the content source 310 can comprise any conventional type of audio and/or video viewing content, such as stored (or time-delayed) viewing content, live (or real-time) viewing content, and/or interactive viewing content, in the manner set forth in the above-referenced co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. Exemplary viewing content 210 can include text messaging, electronic mail (or email), television programming content, music content, podcast content, photograph album content, audiobook content, movie content, and/or game content without limitation.

As desired, the viewing content 210 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. The exemplary viewing content as shown and described herein are not exhaustive and are provided herein for purposes of illustration only and not for purposes of limitation.

The content sources 310 can include one or more internal content sources, such as server system 310A, that are installed aboard the vehicle 390 and/or remote (or terrestrial) content sources 310B that can be external from the vehicle 390. The server system 310A can be provided as an information system controller for providing overall system control functions for the vehicle information system 300 and/or at least one media (or file) server system, as illustrated in FIGS. 10A-B), for storing preprogrammed content and/or downloaded viewing content 210D, as desired. The server system 310A can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system or a hard disk drive (HDD) system, of any suitable kind, for storing the preprogrammed content and/or the downloaded viewing content 210D. As desired, the server system 310A likewise can support decoding and/or digital rights management (DRM) functions of the vehicle information system 300.

Being configured to distribute and/or present the viewing content 210 provided by one or more selected content sources 310, the vehicle information system 300 can communicate with the content sources 310 in real time and in any conventional manner, including via wired and/or wireless communications. The vehicle information system 300 and the terrestrial content source 310B, for example, can communicate in any conventional wireless manner, including directly and/or indirectly via an intermediate communication system 370, such as a satellite communication system 370A. The vehicle information system 300 thereby can receive download viewing content 210D from a selected terrestrial content source 310B and/or transmit upload viewing content 210U, including navigation and other control instructions, to the terrestrial content source 310B. As desired, the terrestrial content source 310B can be configured to communicate with other terrestrial content sources (not shown). The terrestrial content source 310B is shown in FIG. 10B as providing access to the Internet 310C. Although shown and described as comprising the satellite communication system 370A for purposes of illustration, it is understood that the communication system 370 can comprise any conventional type of wireless communication system, such as a cellular communication system (not shown) and/or an Aircraft Ground Information System (AGIS) communication system (not shown).

To facilitate communications with the terrestrial content sources 310B, the vehicle information system 300 can include an antenna system 330 and a transceiver system 340 for receiving the viewing content from the remote (or terrestrial) content sources 310B as shown in FIGS. 10A-B. The antenna system 330 preferably is disposed outside the vehicle 390, such as an exterior surface 394 of a fuselage 392 of the aircraft 390B. The antenna system 330 can receive viewing content 210 from the terrestrial content source 310B and provide the received viewing content 210, as processed by the transceiver system 340, to a computer system 350 of the vehicle information system 300. The computer system 350 can provide the received viewing content 210 to the media server system 310A and/or to one or more of the user interfaces 360, as desired. Although shown and described as being separate systems for purposes of illustration, the computer system 350 and the media server system 310A can be at least partially integrated.

Figure 11:
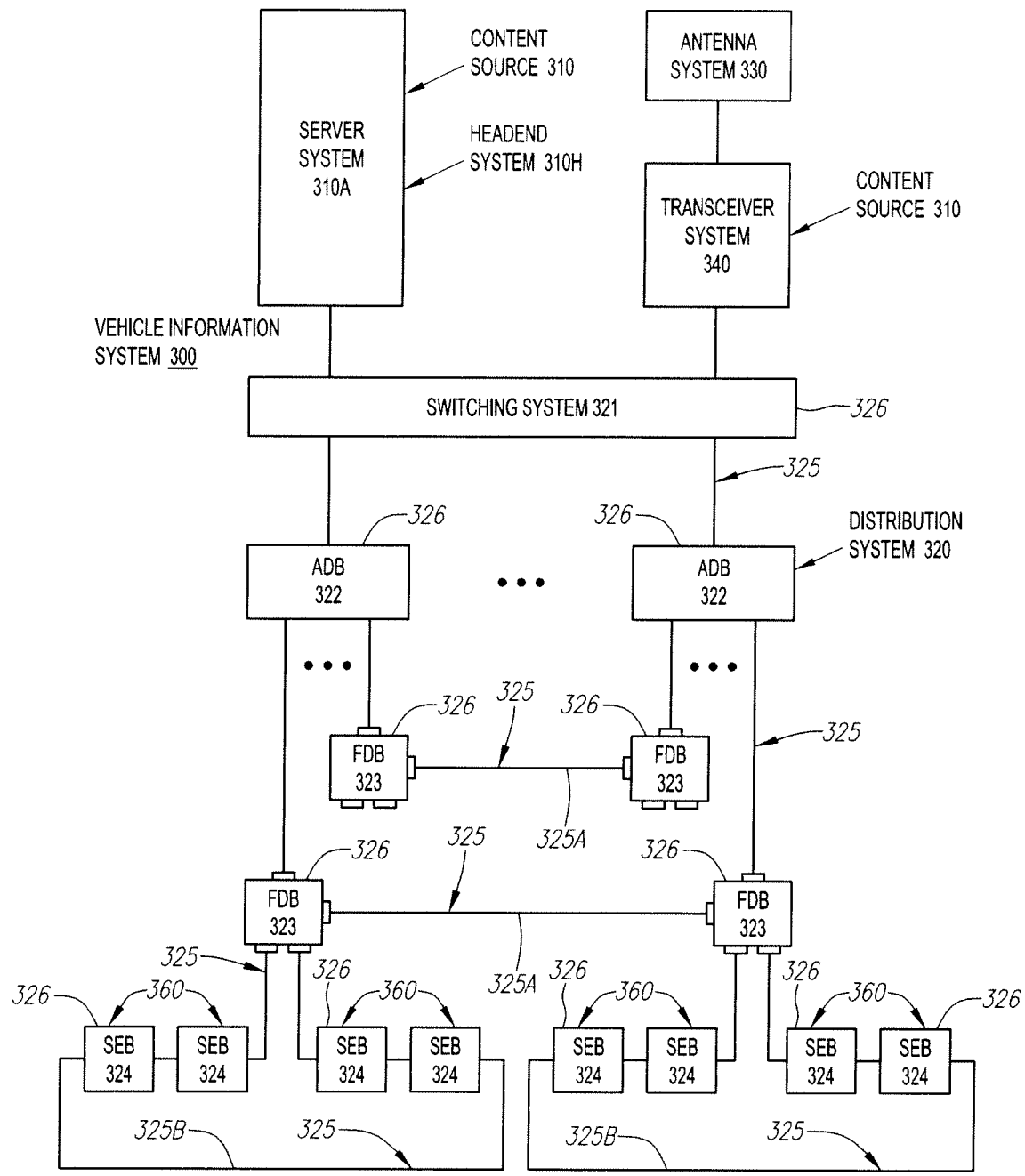
FIG. 11 is an exemplary detail drawing illustrating one embodiment of a distribution system for the information systems of FIGS. 10A-B.

The vehicle information system components, including the content sources 310 and the user interface systems 360, are shown in FIGS. 10A-B as communicating via the content distribution system 320. FIG. 11 illustrates an exemplary content distribution system 320 for the vehicle information system 300. The content distribution system 320 of FIG. 11 couples, and supports communication between a headend system 310H, which includes the content sources 310, and the plurality of user interface systems 360. The distribution system 320 as shown in FIG. 11 is provided in the manner set forth in co-pending United States patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties. Alternatively, and/or additionally, the distribution system 320 can be provided in the manner set forth in the co-pending United States patent application "OPTICAL COMMUNICATION SYSTEM AND METHOD FOR DISTRIBUTING CONTENT ABOARD A MOBILE PLATFORM DURING TRAVEL," Ser. No. 12/367,406, filed Feb. 6, 2009, which is assigned to the assignee of the present application and the disclosure of which is hereby incorporated herein by reference in its entirety.

As desired, the distribution system 320 likewise can include a network management system (not shown) provided in the manner set forth in co-pending United States patent applications, entitled "SYSTEM AND METHOD FOR IMPROVING NETWORK RELIABILITY," Ser. No. 10/773,523, filed on Feb. 6, 2004, and entitled "SYSTEM AND METHOD FOR IMPROVING NETWORK RELIABILITY," Ser. No. 11/086,510, filed on Mar. 21, 2005, which are assigned to the assignee of the present application and the respective disclosures of which are hereby incorporated herein by reference in their entireties.

As illustrated in FIG. 11, the distribution system 320 can be provided as a plurality of line replaceable units (LRUs), including area distribution boxes (ADBs) 322, a plurality of floor disconnect boxes (FDBs) 323, and a plurality of seat electronics boxes (SEBs) (and/or premium seat electronics boxes (PSEBs)) 324 being configured to communicate in real time via a plurality of wired and/or wireless communication connections 325. The line replaceable units of the distribution system 320 likewise can include a switching system 321 for providing an interface between the distribution system 320 and the headend system 310H. The switching system 321 can comprise a conventional switching system, such as an Ethernet switching system, and is configured to couple the headend system 310H with the area distribution boxes 322. Each of the area distribution boxes 322 is coupled with, and communicates with, the switching system 321.

Each of the area distribution boxes 322, in turn, is coupled with, and communicates with, at least one floor disconnect box 323. Although the area distribution boxes 322 and the associated floor disconnect boxes 323 can be coupled in any conventional configuration, the associated floor disconnect boxes 323 preferably are disposed in a star network topology about a central area distribution box 322 as illustrated in FIG. 11. Each floor disconnect box 323 is coupled with, and services, a plurality of daisy-chains of seat electronics boxes 324. The seat electronics boxes 324, in turn, are configured to communicate with the user interface systems 360. Each seat electronics box 324 can support one or more of the user interface systems 360.

As desired, the floor disconnect boxes 323 advantageously can be provided as routing systems and/or interconnected in the manner set forth in the above-referenced co-pending United States patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006. The distribution system 320 can include at least one FDB internal port bypass connection 325A and/or at least one SEB loopback connection 325B. Each FDB internal port bypass connection 325A is a communication connection 325 that permits floor disconnect boxes 323 associated with different area distribution boxes 322 to directly communicate. Each SEB loopback connection 325B is a communication connection 325 that directly couples the last seat electronics box 324 in each daisy-chain of seat electronics boxes 324 for a selected floor disconnect box 323 as shown in FIG. 11. Each SEB loopback connection 325B therefore forms a loopback path among the daisy-chained seat electronics boxes 324 coupled with the relevant floor disconnect box 323.

Returning to FIGS. 10A-B, the user interface systems 360 are provided for selecting viewing content 210 and for presenting the selected viewing content 210. As desired, the user interface systems 360 can comprise conventional passenger interfaces and can be provided in the manner set forth in the above-referenced co-pending United States patent application, entitled "PORTABLE MEDIA DEVICE AND METHOD FOR PRESENTING VIEWING CONTENT DURING TRAVEL," Ser. No. 11/154,749, filed on Jun. 15, 2005, as well as in the manner set forth in the co-pending United States patent application, entitled "SYSTEM AND METHOD FOR PRESENTING HIGH-QUALITY VIDEO," Ser. No. 11/379,360, filed on Apr. 19, 2006, the disclosure of which is hereby incorporated herein by reference in its entirety.

Figure 12A:
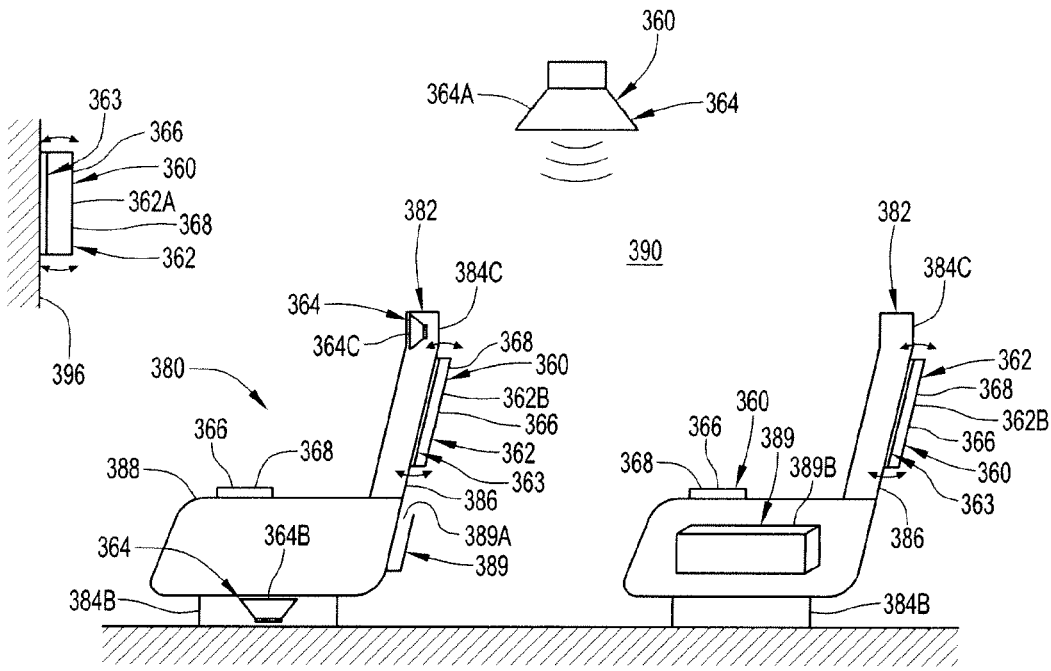
FIG. 12A is an exemplary top-level drawing illustrating a passenger cabin of a passenger vehicle, wherein the information system of FIGS. 10A-B has been installed.

FIG. 12A provides a view of a passenger cabin 380 of a passenger vehicle 390, such as the automobile 390A (shown in FIG. 10A) and/or the aircraft 390B (shown in FIG. 10B), aboard which the vehicle information system 300 has been installed. The passenger cabin 380 is illustrated as including a plurality of passenger seats 382, and each passenger seat 382 is associated with a selected user interface system 360. Each user interface system 360 can include a video interface system 362 and/or an audio interface system 364. Exemplary video interface systems 362 can include overhead cabin display systems 362A with central controls, seatback display systems 362B or armrest display systems (not shown) each with individualized controls, crew display panels, and/or handheld presentation systems. The audio interface systems 364 can be provided in any conventional manner, including an overhead speaker system 364A, the handheld presentation systems, and/or headphones coupled with an audio jack provided, for example, at an armrest 388 of the user seat 382. A speaker system likewise can be associated with the user seat 382, such as a speaker system 364B disposed within a base 384B of the user seat 382 and/or a speaker system 364C disposed within a headrest 384 of the user seat 382. In a preferred embodiment, the audio interface system 364 can include an optional noise-cancellation system for further improving sound quality produced by the audio interface system 364.

The video interface systems 362 and the audio interface systems 364 can be installed at any suitable cabin surface, such as a seatback 386, wall 396, ceiling, and/or bulkhead, or an armrest 388 of a passenger seat 382 in any conventional manner including via a mounting system 363 provided in the manner set forth co-pending United States patent applications, entitled "SYSTEM AND METHOD FOR MOUNTING USER INTERFACE DEVICES," Ser. No. 11/828,193, filed on Jul. 25, 2007, and entitled "USER INTERFACE DEVICE AND METHOD FOR PRESENTING VIEWING CONTENT," Ser. No. 11/835,371, filed on Aug. 7, 2007, which are assigned to the assignee of the present application and the respective disclosures of which are hereby incorporated herein by reference in their entireties.

As shown in FIG. 12A, the user interface system 360 likewise can include an input system 366 for permitting the user (or passenger) to communicate with the vehicle information system 300, such as via an exchange of control signals 220. For example, the input system 366 can permit the user to enter one or more user instructions 230 for controlling the operation of the vehicle information system 300. Illustrative user instructions 230 can include instructions for initiating communication with the content source 310, instructions for selecting viewing content 210 for presentation, and/or instructions for controlling the presentation of the selected viewing content 210. If a fee is required for accessing the viewing content 210, payment information likewise can be entered via the input system 366.

The input system 366 can be provided in any conventional manner and typically includes one or more switches (or pushbuttons), such as a keyboard or a keypad, and/or a pointing device, such as a mouse, trackball, or stylus. As desired, the input system 366 can be at least partially integrated with, and/or separable from, the associated video interface system 362 and/or audio interface system 364. For example, the video interface system 362 and the input system 366 can be provided as a touchscreen display system. The input system 366 likewise can include one or more input ports (not shown) for coupling a peripheral input device (not shown), such as a full-size computer keyboard, an external mouse, and/or a game pad, with the vehicle information system 300.

Preferably, at least one of the user interface systems 360 includes a wired and/or wireless access point 368, such as a conventional communication port (or connector), for coupling a personal media device 200 (shown in FIG. 12B) with the vehicle information system 300. Passengers (not shown) who are traveling aboard the vehicle 390 thereby can enjoy personally-selected viewing content during travel. The access point 368 is located proximally to an associated passenger seat 382 and can be provided at any suitable cabin surface, such as a seatback 386, wall 396, ceiling, and/or bulkhead.

Figure 12B:
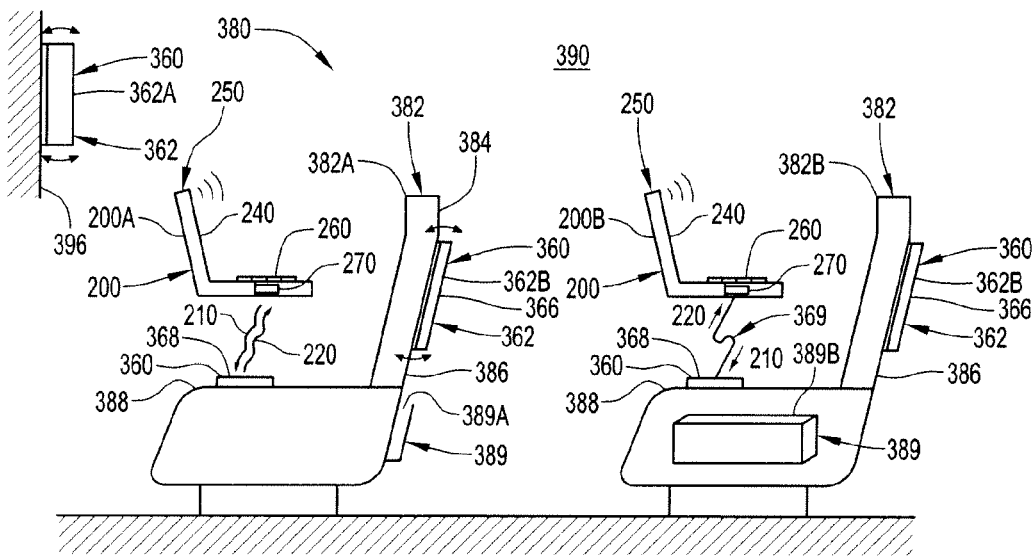
FIG. 12B is an exemplary top-level drawing illustrating an embodiment of the information system of FIG. 12A, wherein the information system is in communication with a personal media device.

Turning to FIG. 12B, the personal media devices 200 and the vehicle information system 300 are shown as communicating via respective access points 368. The personal media device 200 can store the audio and/or video viewing content 210 and can be provided as a handheld device, such as a laptop computer, a palmtop computer, a personal digital assistant (PDA), cellular telephone, and/or a MPEG Audio Layer 3 (MP3) device. Illustrative personal media devices 200 are shown and described in the co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," Ser. No. 12/210,624, filed on Sep. 15, 2008; entitled "MEDIA DEVICE INTERFACE SYSTEM AND METHOD FOR VEHICLE INFORMATION SYSTEMS," Ser. No. 12/210,636, filed Sep. 15, 2008; entitled "MEDIA DEVICE INTERFACE SYSTEM AND METHOD FOR VEHICLE INFORMATION SYSTEMS," Ser. No. 12/210,652, filed Sep. 15, 2008; and entitled "PORTABLE USER CONTROL DEVICE AND METHOD FOR VEHICLE INFORMATION SYSTEMS," Ser. No. 12/210,689, filed on Sep. 15, 2008, which are assigned to the assignee of the present application and the respective disclosures of which are hereby incorporated herein by reference in their entireties.

As shown in FIG. 12B, the personal media devices 200 each include a video display system 240 for visually presenting the viewing content 210 and an audio system 250 for audibly presenting the viewing content 210. Each personal media device 200 can include a user control system 260, which can be provided in any conventional manner and typically includes one or more switches (or pushbuttons), such as a keyboard or a keypad, and/or a pointing device, such as a mouse, trackball, or stylus. The personal media devices 200 thereby can select desired viewing content 210 and control the manner in which the selected viewing content 210 is received and/or presented.

The personal media devices 200 likewise include a communication port (or connector) 270. The communication port 270 enables the personal media devices 200 to communicate with the vehicle information system 300 via the access points 368 of the user interface systems 360. As illustrated with personal media device 200A, the communication port 270 and the access points 368 can supported wireless communications; whereas, support for wired communications between the communication port 270 and the access points 368 via a communication cable assembly 369 is shown with personal media device 200B. When the communication port 270 and the access points 368 are in communication, the vehicle information system 300 supports a simple manner for permitting the associated personal media device 200 to be integrated with the vehicle information system 300 using a user-friendly communication interface.

When the personal media device 200 and the vehicle information system 300 are in communication, the vehicle information system 300 can perform a plurality of integration tasks simultaneously, enabling the personal media device 200 to become fully integrated with the vehicle information system 300 via a selected access point 368. The system components of the vehicle information system 300 and the personal media device 200 thereby become interchangeable. The personal media device 200 likewise can receive control signals (or commands) 220 and/or operating power 220P from the vehicle information system 300. Thereby, the personal media device 200 advantageously can become a seamless part of the vehicle information system 300.

For example, user instructions 230 (shown in FIGS. 10A-B) for controlling the operation of the vehicle information system 300 can be provided via the input system 366 of the vehicle information system 300 and/or the user control system 260 of the personal media device 200. In other words, the input system 366 of the vehicle information system 300 and/or the user control system 260 of the personal media device 200 can be used to select viewing content 210 and control the manner in which the selected viewing content 210 is received and/or presented. The selected viewing content 210 can be provided by a relevant content source 310 (shown in FIGS. 10A-B) of the vehicle information system 300 and/or by storage media (not shown) disposed within the personal media device 200. A video portion of the selected viewing content 210 thereby can be presented via the video presentation system 362 of the vehicle information system 300 and/or the video display system 240 of the personal media device 200. The audio presentation system 364 of the vehicle information system 300 and/or the audio system 250 of the personal media device 200 can be used to present an audio portion of the selected viewing content 210. If the video display system 240 of the personal media device 200 is much smaller than the video presentation system 362 of the vehicle information system 300, a passenger may prefer to view the selected viewing content 210 via the larger video presentation system 362.

When no longer in use and/or direct physical contact with the personal media device 200 is not otherwise required, the personal media device 200 can be stored at the user seat 382. For example, the user seat 382 can include a storage compartment 389 for providing storage of the personal media device 200. The storage compartment 389 can be provided in any conventional manner and at any suitable portion of the user seat 382. As illustrated with passenger seat 382B, the personal media device 200 can be placed in a storage pocket 389B formed in the armrest 388 of the user seat 382B. The storage compartment 389 likewise can be provided on the seatback 386 and/or the headrest 384 of the user seat 382. Storage compartment 389A of passenger seat 382A, for example, is shown as being formed on the lower seatback 386 of the user seat 382A. As desired, the storage compartment 389 can comprise an overhead storage compartment, a door storage compartment, a storage compartment provided underneath the user seat 382, or any other type of conventional storage compartment, such as a glove compartment, trunk, or closet, available in the passenger vehicle 390.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A user interface system for installation at a user seat, comprising:
    an interface housing mounted on the user seat, the interface housing having a transparent face panel and a port panel region disposed at a selected port panel region angle relative to said transparent face panel and forming a plurality of port openings, said interface housing being immovably coupled with a shroud having a central shroud region being planar and an angled shroud portion being sloped adjacent to the central shroud region, defining a module opening and forming a pocket; and
    a plurality of user interface system components including a video interface system having a touchscreen display for presenting control indicia and a touch point for activating the control indicia and a plurality of communication ports, said touchscreen display being disposed adjacent to said transparent face panel, said communication ports each being disposed adjacent to a respective port opening of said port panel region,
    wherein said port panel region is disposed flush within the module opening to be coplanar with the angled shroud portion that forms the pocket, thereby defining a channel, and
    wherein a selected communication port enables said video interface system to couple with a user peripheral device via a selected port opening of the port panel region defining the channel.

2. The user interface system of claim 1, wherein the channel is provided with suitable dimensions for receiving at least one of the user peripheral device, a communication cable for supporting communication between the user peripheral device and said selected communication port, a module communication connector for coupling the communication cable with the selected communication port, and a strain relief associated with the module communication connector.

3. The user interface system of claim 1, wherein said touchscreen display is divided into a plurality of viewing regions, including a first viewing region for presenting viewing content and a second viewing region for presenting the control indicia.

4. The user interface system of claim 1, wherein the video interface system is provided with a negative monitor tilt.

5. The user interface system of claim 4, wherein the negative monitor tilt comprises a predetermined tilt angle within a tilt angle range between one degree and thirty degrees back of vertical.

6. The user interface system of claim 5, wherein the predetermined tilt angle comprises a fixed tilt angle that is five degrees back of vertical.

7. The user interface system of claim 1, further comprising a proximity sensor system for at least one of activating the control indicia and illuminating said selected communication port without requiring actual contact with said touch point.

8. The user interface system of claim 7, wherein said proximity sensor system provides multicolor illumination for said selected communication port.

9. The user interface system of claim 1, wherein said selected communication port is selected from a group consisting of an audio connector for coupling a peripheral audio device with said video interface system of the user interface system and an access point for coupling a personal media device with said video interface system.

10. The user interface system of claim 1, further comprising a card reader disposed within said interface housing, wherein said interface housing defines an aperture at a junction between said transparent face panel and said port panel region and adjacent to a card slot of said card reader such that said card slot receives a user card via the aperture.

11. The user interface system of claim 10, wherein said user interface system prompts use of said card reader by at least one of illuminating said card slot and presenting an animation for providing instruction for using said card reader.

12. The user interface system of claim 1, wherein the port panel region angle comprises a predetermined port panel region angle within a port panel region angle range between forty degrees and fifty degrees.

13. An information system, comprising:
a headend system for providing overall system control functions for the information system;
a distribution system; and
a user interface system for communicating with said headend system via said distribution system, said user interface system being disposed within a seatback of a selected passenger seat and being characterized by claim 1.

14. The information system of claim 13, wherein the information system is suitable for installation aboard a passenger vehicle.

15. An aircraft, comprising:
a fuselage;
a passenger seat disposed within said fuselage and including a seatback defining a seatback envelope; and
a vehicle information system coupled with said fuselage and being characterized by claim 13, said vehicle information system including a user interface system disposed within said seatback of said passenger seat.

16. A method for providing a user interface system at a user seat, comprising:
forming an integrated system module by disposing a video interface system having a touchscreen display and a plurality of communication ports within an interface housing mounted on the user seat, the interface housing having a transparent face panel and a port panel region disposed at a predetermined port panel region angle relative to said transparent face panel, said transparent face panel being disposed adjacent to said touchscreen display, said port panel region forming a plurality of openings associated with said plurality of communication ports;
disposing said transparent face panel and said port panel region of said integrated system module within a module opening defined by a central shroud region and an angled shroud portion of a shroud, the central shroud region being planar and the angled shroud portion being sloped adjacent to the central shroud region and thereby forming a pocket;
immovably coupling said module housing with said shroud such that said transparent face panel is flush and coplanar with the central shroud region and said port panel region is flush and coplanar with the angled shroud portion that forms the pocket; and
forming a channel with said port panel region and the angled shroud portion that forms the pocket, wherein a selected communication port enables said video interface system to couple with a user peripheral device via a selected opening of the port panel region defining the channel.

17. The method of claim 16, further comprising providing the video interface system with a negative monitor tilt.

18. The method of claim 16, further comprising enabling at least one of the control indicia to be activated and said selected communication port to be illuminated without requiring actual contact with said touch point.

19. The method of claim 16, further comprising prompting use of a selected interfaced system component by at least one of illuminating said selected interfaced system component and presenting an animation for providing instruction for using said selected interfaced system component.

20. A user interface system for installation at a user seat, comprising:
an interface housing mounted on the user seat, the interface housing having a transparent face panel and a port panel region being disposed at a port panel region angle relative to said transparent face panel and forming a plurality of port openings;
a plurality of user interface system components being disposed within said interface housing and including a video interface system having a touchscreen display for presenting control indicia and a plurality of communication ports, said touchscreen display being disposed adjacent to said transparent face panel, said communication ports each being disposed adjacent to a respective port opening of said port panel region; and
a shroud having a central shroud region being planar and an angled shroud portion being sloped adjacent to the central shroud region, defining a module opening, forming a pocket, and being immovably coupled with said interface housing,
wherein said port panel region is disposed flush within the module opening to be coplanar with said angled shroud portion that forms the pocket.

21. The user interface system of claim 20, wherein said port panel region being disposed within the module opening and being coplanar with said angled shroud portion thereby claims a channel, and a selected communication port enables said video interface system to couple with a user peripheral device via a selected port opening of the port panel region defining the channel.

22. The user interface system of claim 21, wherein the channel is provided with suitable dimensions for receiving at least one of the user peripheral device, a communication cable assembly for supporting communication between the user peripheral device and said selected communication port, a module communication connector for coupling the communication cable assembly with the selected communication port, and a strain relief associated with the module communication connector.

23. The user interface system of claim 20, wherein the video interface system is provided with a negative monitor tilt.

24. The user interface system of claim 20, further comprising a proximity sensor system for at least one of activating the control indicia and illuminating said selected communication port without requiring actual contact with a touch point presented by said touchscreen display for activating the control indicia.

25. The user interface system of claim 20, wherein said selected communication port is selected from a group consisting of an audio connector for coupling a peripheral audio device with said video interface system of the user interface system and an access point for coupling a personal media device with said video interface system.

26. The user interface system of claim 20, further comprising a card reader disposed within said interface housing, wherein said interface housing defines an aperture at a junction between said transparent face panel and said port panel region and adjacent to a card slot of said card reader such that said card slot receives a user card via the aperture.

27. The user seat of claim 20, comprising:
a seat frame;
a tray table coupled to said seat frame;
a seat cushion coupled to said seat frame; and
a seatback coupled to said seat frame and forming a seatback envelope for receiving the user interface system of claim 20,
wherein the channel inhibits interference between the user peripheral device and said tray table in a stowed position, in a deployed position, and during transitions between the stowed position and the deployed position.

28. A vehicle information system suitable for installation aboard a passenger vehicle, comprising:
a headend system for providing overall system control functions for the vehicle information system;
a distribution system; and
a user interface system for communicating with said headend system via said distribution system, said user interface system being disposed within a seatback of a selected passenger seat disposed aboard the passenger vehicle and being provided in accordance with claim 20.

29. An aircraft, comprising:
a fuselage;
a passenger seat disposed within said fuselage and including a seatback defining a seatback envelope; and
a vehicle information system coupled with said fuselage and being provided in accordance with claim 28, said vehicle information system including a user interface system disposed within said seatback of said passenger seat.

30. A user chair, comprising:
a chair frame;
a chair seat coupled to said chair frame; and
a seatback coupled to said chair frame and forming a seatback envelope for receiving the user interface system of claim 1.

31. The user chair of claim 30, further comprising a tray table, wherein the channel inhibits interference between the user peripheral device and said tray table in a stowed position, in a deployed position, and during transitions between the stowed position and the deployed position.

32. The user chair of claim 30, wherein the user chair is suitable for installation aboard a passenger vehicle, and wherein the user interface system is suitable for communicating with a vehicle information system installed aboard the passenger vehicle.

* * * * *